(12) United States Patent
Kato

(10) Patent No.: US 10,726,316 B2
(45) Date of Patent: Jul. 28, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Minako Kato, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/657,910

(22) Filed: Oct. 18, 2019

(65) Prior Publication Data

US 2020/0134403 A1 Apr. 30, 2020

(30) Foreign Application Priority Data

Oct. 29, 2018 (JP) ................... 2018-203274

(51) Int. Cl.
*G06K 15/02* (2006.01)
*G06K 15/10* (2006.01)

(52) U.S. Cl.
CPC ......... *G06K 15/188* (2013.01); *G06K 15/102* (2013.01)

(58) Field of Classification Search
None
See application file for complete search history.

(56) References Cited

U.S. PATENT DOCUMENTS

| | | | | |
|---|---|---|---|---|
| 5,861,896 A * | 1/1999 | Barton | ................. | B41J 2/2107 347/15 |
| 6,683,996 B1 * | 1/2004 | Walmsley | ............. | B41J 2/04528 382/296 |
| 6,873,436 B1 | 3/2005 | Terada | | |
| 8,567,891 B2 * | 10/2013 | Nagoshi | ................. | B41J 2/2056 347/15 |
| 10,022,980 B2 * | 7/2018 | Tanaka | ................. | B41J 2/2125 |
| 2001/0052971 A1 * | 12/2001 | Tsuchiya | ................. | H04N 1/60 355/77 |
| 2003/0048327 A1 * | 3/2003 | Serra | ................. | B41J 19/147 347/43 |
| 2003/0081229 A1 * | 5/2003 | Underwood | ......... | H04N 1/6033 358/1.9 |
| 2011/0058198 A1 * | 3/2011 | Teraue | ................. | H04N 1/6033 358/1.9 |
| 2011/0148969 A1 * | 6/2011 | Nakamura | ............. | B41J 2/2146 347/15 |
| 2012/0081441 A1 * | 4/2012 | Miyake | ................. | G06K 9/03 347/15 |
| 2012/0081768 A1 * | 4/2012 | Iguchi | ................. | H04N 1/4015 358/518 |
| 2012/0218574 A1 * | 8/2012 | Fukuda | ................. | H04N 1/6033 358/1.9 |

(Continued)

FOREIGN PATENT DOCUMENTS

JP 2012-006385 A 1/2012

*Primary Examiner* — Anh-Vinh T Nguyen
(74) *Attorney, Agent, or Firm* — Canon U.S.A., Inc., IP Division

(57) ABSTRACT

In conventional color shading (CS) processing for correcting color unevenness with high precision, even an image to preserve pure colors can be corrected to use inks of other colors. Color unevenness is more appropriately corrected to provide a favorable image by properly using pure color preservation information and pure color non-preservation information as color correction information for the CS processing.

26 Claims, 13 Drawing Sheets

(56) References Cited

U.S. PATENT DOCUMENTS

| | | | |
|---|---|---|---|
| 2012/0224199 A1* | 9/2012 | Fukuda | H04N 1/6075 358/1.9 |
| 2013/0235108 A1* | 9/2013 | Mizuno | B41J 2/205 347/15 |
| 2016/0031208 A1* | 2/2016 | Kobayashi | B41J 19/147 347/14 |

* cited by examiner

FIG.8A

Table 1 — Input

| R | G | B |
|---|---|---|
| 0 | 0 | 0 |
| 0 | 0 | 16 |
| ... | ... | ... |
| 16 | 16 | 16 | ← INPUT DATA: PURE GRAY COLOR
| ... | ... | ... |
| 255 | 16 | 16 | ← INPUT DATA: PURE R COLOR
| ... | ... | ... |
| 255 | 255 | 0 | ← INPUT DATA: PURE Y COLOR
| ... | ... | ... |
| 255 | 255 | 255 |

Table 2 — Output 1

| R | G | B |
|---|---|---|
| 0 | 0 | 0 |
| 1 | 0 | 14 |
| ... | ... | ... |
| 15 | 14 | 16 |
| ... | ... | ... |
| 254 | 15 | 17 |
| ... | ... | ... |
| 255 | 254 | 1 |
| ... | ... | ... |
| 255 | 255 | 255 |

Table 3 — Output 2

| R | G | B |
|---|---|---|
| 0 | 0 | 0 |
| 1 | 0 | 14 |
| ... | ... | ... |
| 15 | 15 | 15 |
| ... | ... | ... |
| 255 | 15 | 15 |
| ... | ... | ... |
| 255 | 255 | 1 |
| ... | ... | ... |
| 255 | 255 | 255 |

FIG.8B

Table 1 — Input

| R | G | B |
|---|---|---|
| 0 | 0 | 0 |
| 0 | 0 | 16 |
| ... | ... | ... |
| 16 | 16 | 16 | ← INPUT DATA: PURE GRAY COLOR
| ... | ... | ... |
| 255 | 16 | 16 | ← INPUT DATA: PURE R COLOR
| ... | ... | ... |
| 255 | 255 | 0 | ← INPUT DATA: PURE Y COLOR
| ... | ... | ... |
| 255 | 255 | 255 |

Table 4 — Output 1

| C | M | Y | K |
|---|---|---|---|
| 0 | 0 | 0 | 250 |
| 10 | 5 | 0 | 245 |
| ... | ... | ... | ... |
| 1 | 1 | 0 | 240 |
| ... | ... | ... | ... |
| 2 | 238 | 240 | 0 |
| ... | ... | ... | ... |
| 1 | 1 | 240 | 0 |
| ... | ... | ... | ... |
| 0 | 0 | 0 | 0 |

Table 5 — Output 2

| C | M | Y | K |
|---|---|---|---|
| 0 | 0 | 0 | 250 |
| 10 | 5 | 0 | 245 |
| ... | ... | ... | ... |
| 0 | 0 | 0 | 240 |
| ... | ... | ... | ... |
| 0 | 239 | 240 | 0 |
| ... | ... | ... | ... |
| 0 | 0 | 241 | 0 |
| ... | ... | ... | ... |
| 0 | 0 | 0 | 0 |

FIG.8C

Table 6 — Input

| C | M | Y | K |
|---|---|---|---|
| 100 | 0 | 0 | 0 | ⎫
| 75 | 0 | 0 | 0 | ⎪
| 50 | 0 | 0 | 0 | ⎬ PURE COLORS
| 25 | 0 | 0 | 0 | ⎪
| 0 | 0 | 0 | 0 | ⎪
| 0 | 100 | 0 | 0 | ⎭
| ... | ... | ... | ... |
| 50 | 25 | 75 | 25 |

Table 7 — Input 1

| C | M | Y | K |
|---|---|---|---|
| 95 | 3 | 0 | 0 |
| 70 | 2 | 0 | 0 |
| 45 | 1 | 0 | 0 |
| 20 | 1 | 0 | 0 |
| 0 | 0 | 0 | 0 |
| 0 | 98 | 0 | 0 |
| ... | ... | ... | ... |
| 45 | 23 | 72 | 20 |

Table 8 — Output 2

| C | M | Y | K |
|---|---|---|---|
| 95 | 0 | 0 | 0 |
| 70 | 0 | 0 | 0 |
| 45 | 0 | 0 | 0 |
| 20 | 0 | 0 | 0 |
| 0 | 0 | 0 | 0 |
| 0 | 98 | 0 | 0 |
| ... | ... | ... | ... |
| 45 | 23 | 72 | 20 |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method for processing image data for recording an image on a recording medium, and a storage medium.

Description of the Related Art

Recording heads used in an inkjet recording apparatus can vary in discharge characteristics, such as an amount of discharge and a direction of discharge, nozzle by nozzle due to a manufacturing error and other reasons. Such variations in the discharge characteristics can cause density unevenness and color differences in a recorded image.

To address the density unevenness resulting from variations in the discharge characteristics, a technique for uniformizing recording densities to a target density by correcting image data and controlling driving pulses has been used. For example, as a method for correcting image data, a head shading (HS) method for correcting the density of an image to be recorded by adjusting the numbers of ink droplets applied to a recording medium based on the discharge characteristics has been known.

Japanese Patent Application Laid-Open No. 2012-006385 discusses a color shading (CS) method for multidimensionally correcting image data as a method for correcting a color difference that occurs in an image formed by superposing and mixing two or more types of inks due to variations in the discharge characteristics.

Meanwhile, among user demands for print products, there is "pure color preservation". An example of such a demand is that only yellow ink be used for a yellow image.

SUMMARY OF THE INVENTION

According to an aspect of the present invention, an image processing apparatus configured to process image data for a recording apparatus, the recording apparatus being configured to record an image on a recording medium by applying ink from a recording device while relatively conveying the recording device and the recording medium in a second direction intersecting a first direction, the recording device including a first nozzle row in which a plurality of nozzles configured to discharge a first ink is arranged in the first direction and a second nozzle row in which a plurality of nozzles configured to discharge a second ink of different color from that of the first ink is arranged in the first direction, the first and second nozzle rows being arranged in the second direction, includes a color conversion unit configured to color-convert image data including a plurality of components corresponding to a plurality of colors into image data including a plurality of components in a color space reproducible by the recording apparatus, a color correction unit configured to color-correct the image data including the plurality of components color-converted by the color conversion unit into image data including a plurality of components by using color correction information for correcting a color shift due to a variation in a discharge characteristic of the nozzles, and a generation unit configured to generate ink color data indicating amounts of application of the respective first and second inks based on the image data including the plurality of components color-corrected by the color correction unit, wherein in a case where image data indicating a predetermined color having a hue corresponding to the first ink is color-corrected by using first information as the color correction information, ink color data generated based on the color-corrected image data indicating the predetermined color indicates that the first ink is applied and the second ink is not applied, and wherein in a case where the image data indicating the predetermined color is color-corrected by using second information as the color correction information, the ink color data generated based on the color-corrected image data indicating the predetermined color indicates that the second ink is applied.

Further features of the present invention will become apparent from the following description of embodiments with reference to the attached drawings.

BRIEF DESCRIPTION OF THE DRAWINGS

FIGS. 8A, 8B, and 8C illustrate examples of conversion tables for CS processing.

DESCRIPTION OF THE EMBODIMENTS

Embodiments will be described below with reference to the drawings.

Figure 1A:
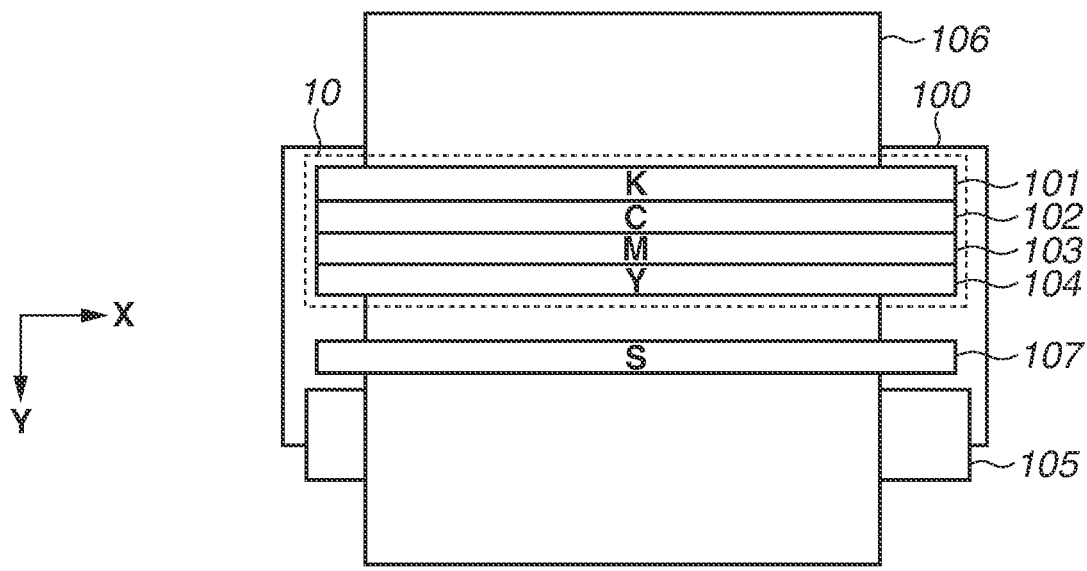
FIGS. 1A, 1B, and IC are diagrams schematically illustrating a recording apparatus.

FIG. 1A is a diagram schematically illustrating an example of an inkjet recording apparatus applicable in a first embodiment. A recording apparatus 100 is a full-line recording apparatus and records an image by applying ink to a recording medium 106 conveyed in a Y direction in FIG. 1A.

Recording heads 101, 102, 103, and 104 are included in a recording device 10. The recording heads 101, 102, 103, and 104 are recording heads including nozzle rows for discharging black (K), cyan (C), magenta (M), and yellow (Y) inks, respectively. As illustrated in FIG. 1A, the recording heads 101, 102, 103, and 104 are arranged along an X direction. Each of the nozzle rows includes a plurality of nozzles for discharging the same type of ink, arranged at a pitch of 1200 dpi. Each of the nozzle rows has a length corresponding to a width of the recording medium 106 in the X direction in the diagram.

A conveyance roller 105 and other not-illustrated rollers are rotated by the driving force of a motor (not illustrated), whereby the recording medium 106 is conveyed in the Y direction in FIG. 1A. As the recording medium 106 is conveyed, the inks are discharged from the plurality of nozzles of the recording heads 101 to 104, whereby an image is recorded.

The recording apparatus 100 includes a scanner 107 arranged downstream of the recording heads 101 to 104 in the Y direction in which the recording medium 106 is conveyed, in parallel with the recording heads 101 to 104. The scanner 107 includes reading elements arranged at a predetermined pitch, and reads the image recorded by the recording heads 101 to 104. The scanner 107 outputs the read data as red, green, blue (RGB) multivalued data. The scanner 107 functions as a reading apparatus for reading a test pattern to determine correction values corresponding to the respective nozzles in head shading (HS) processing and color shading (CS) processing to be described below. The scanner 107 serving as the reading apparatus may be arranged in parallel with the recording heads 101 to 104 as illustrated in FIG. 1A, or provided outside the recording apparatus 100. If the reading apparatus is provided outside the recording apparatus 100, an operation for reading a test pattern is needed after the test pattern is recorded by the recording apparatus 100.

Figure 12:
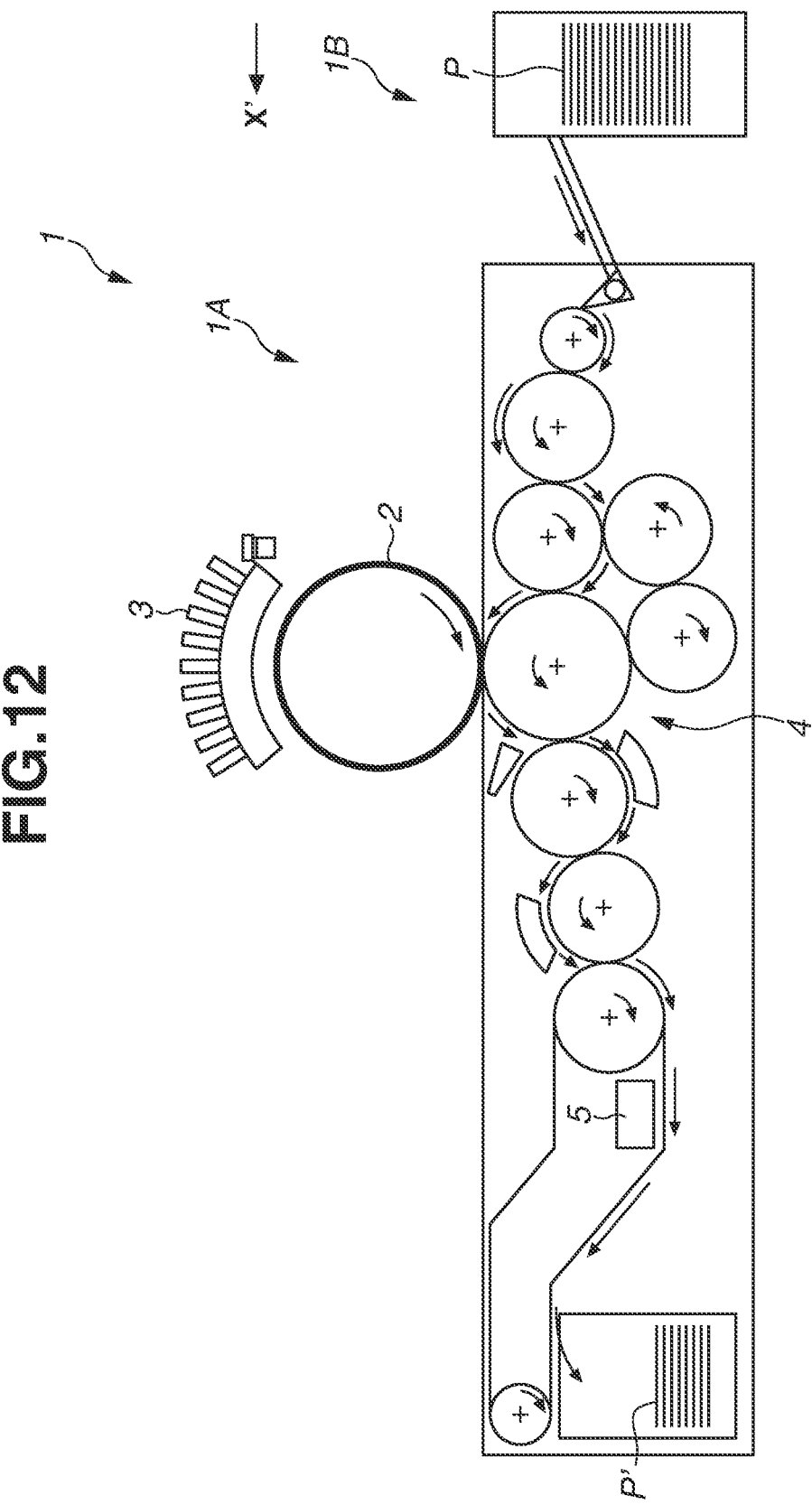
FIG. 12 is a diagram for describing a configuration of a transfer recording apparatus.

The recording apparatus 100 applicable to the present embodiment is not limited to a direct-drawing recording apparatus that directly applies ink to a recording medium as described above. For example, as illustrated in FIG. 12, a transfer recording apparatus that transfers an image, which is formed by applying ink to an intermediate transfer member, to a recording medium may be used. In FIG. 12, a recording system 1 is a sheet-fed inkjet recording apparatus that manufactures a recording product P' by transferring an ink image to a recording medium P via a transfer member 2. The recording system 1 includes a recording apparatus IA and a conveyance apparatus 1B. The recording medium P is conveyed in an X' direction in FIG. 12. The recording apparatus IA includes a transfer unit 4 and a recording unit 3. Recording heads of the recording unit 3 discharge ink to the transfer member 2, whereby an ink image of a recording image is formed on the transfer member 2. The formed ink image is transferred to the recording medium P being conveyed, whereby the recording product P' is formed. In performing the CS processing to be described below, a test pattern is recorded on the recording medium P and read by a reading apparatus 5.

The type of recording apparatus is not limited as long as the recording apparatus records an image on a recording medium. For example, a serial recording apparatus that relatively scans the recording medium with recording heads in a direction intersecting the conveyance direction of a recording medium may be used. Further, the configuration of the recording device 10 is not limited to the configuration including the recording heads 101 to 104. The recording device 10 can also use a configuration including one recording head having a plurality of nozzle rows respectively corresponding to a plurality of color inks.

Figure 1B:
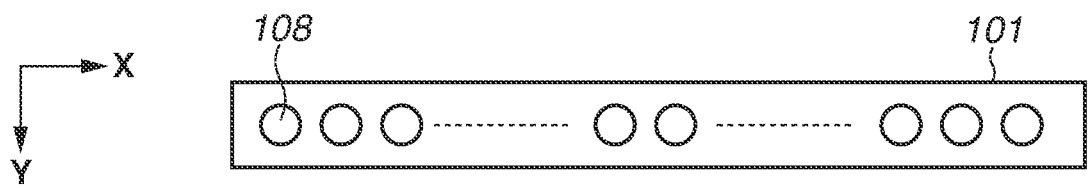

FIG. 1B is a diagram illustrating a nozzle row included in the recording head 101. A plurality of nozzles 108 is arranged in the X direction, and a recording element for discharging ink droplets is provided inside each of the nozzles 108. Since sizes and directions of the discharged ink droplets vary due to manufacturing variations of each of the nozzles 108, amounts and positions of the ink droplets impacting on the recording medium 106 can vary. Such variations in the discharge characteristics are visually observed as "unevenness". While FIG. 1B illustrates an example in which the recording head 101 includes one nozzle row, the recording head 101 may be configured to include a plurality of similar nozzle rows. Each of the recording heads 102 to 104 also has a similar configuration. The sizes of ink droplets to be discharged may be optimized for each of the recording heads. The number of nozzle rows may be changed as appropriate.

Figure 1C:
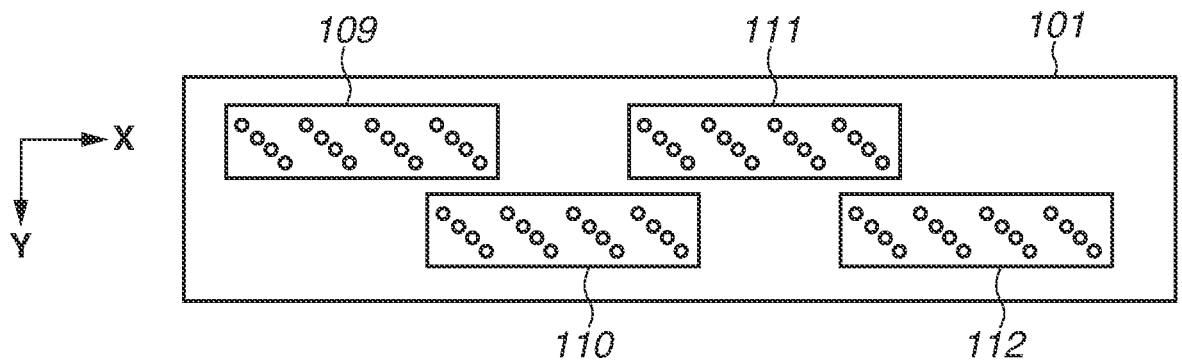

FIG. 1C illustrates another configuration example of the recording head 101. The recording head 101 includes a plurality of discharge substrates 109, 110, 111, and 112. The discharge substrates 109 to 112 are arranged in a staggered pattern so that the discharge substrates 109 to 112 overlap with each other when viewed in the Y direction. Each of the discharge substrates includes four nozzle rows arranged in the Y direction, each of the rows including a plurality of nozzles arranged in the X direction.

Figure 2:
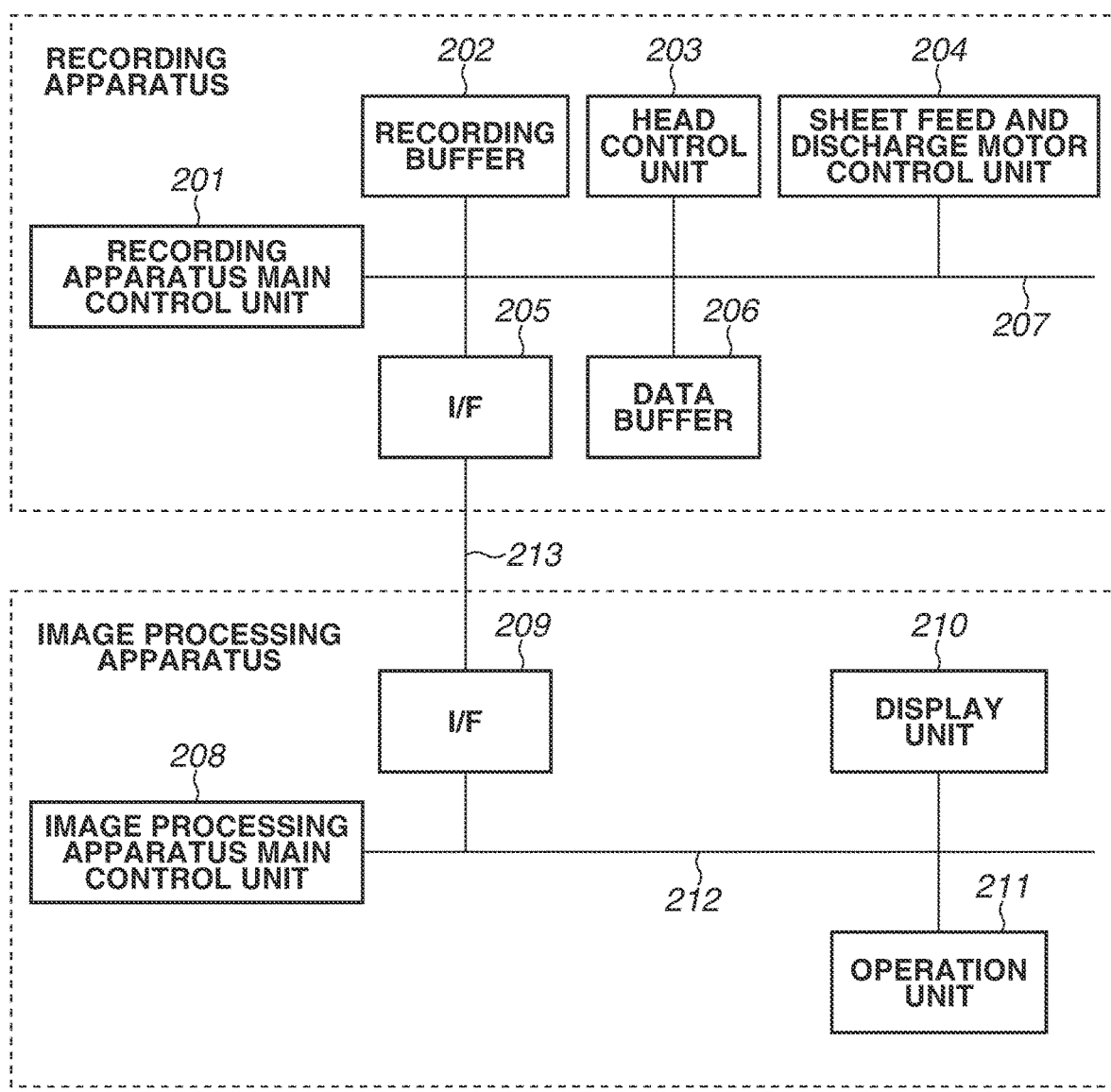
FIG. 2 is a block diagram illustrating a control configuration of a recording system.

FIG. 2 is a block diagram illustrating a control configuration of an inkjet recording system applicable to the present embodiment. The inkjet recording system according to the present embodiment includes an image processing apparatus and an inkjet recording apparatus (hereinafter referred to simply as a recording apparatus).

The recording apparatus includes a recording apparatus main control unit 201 that controls the entire recording apparatus and includes a central processing unit (CPU), a read-only memory (ROM), and a random access memory (RAM). A recording buffer 202 stores image data yet to be transferred to a head control unit 203 for controlling the recording heads 101 to 104 as raster data. The head control unit 203 controls the discharge of ink from the nozzles of the recording heads 101 to 104 based on the image data stored in the recording buffer 202. A sheet feed and discharge motor control unit 204 controls conveyance, feeding, and discharge of the recording medium 106. An interface (I/F) 205 transmits and receives a data signal to and from the image processing apparatus. An I/F signal line 213 connects the recording apparatus and the image processing apparatus. A data buffer 206 temporarily stores image data received from the image processing apparatus. A system bus 207 connects the recording apparatus main control unit 201 with various functions of the recording apparatus.

The image processing apparatus includes an image processing apparatus main control unit 208 that controls the entire image processing apparatus and includes a CPU, ROM, and RAM. An I/F 209 transmits and receives the data signal to and from the recording apparatus. A display unit 210 displays various types of information to a user. For example, a liquid crystal display (LCD) can be applied. An operation unit 211 such as a keyboard and a mouse can accept an input from the user. A system bus 212 connects the image processing apparatus main control unit 208 with various functions of the image processing apparatus.

(Conventional Image Processing Configuration)

Figure 3:
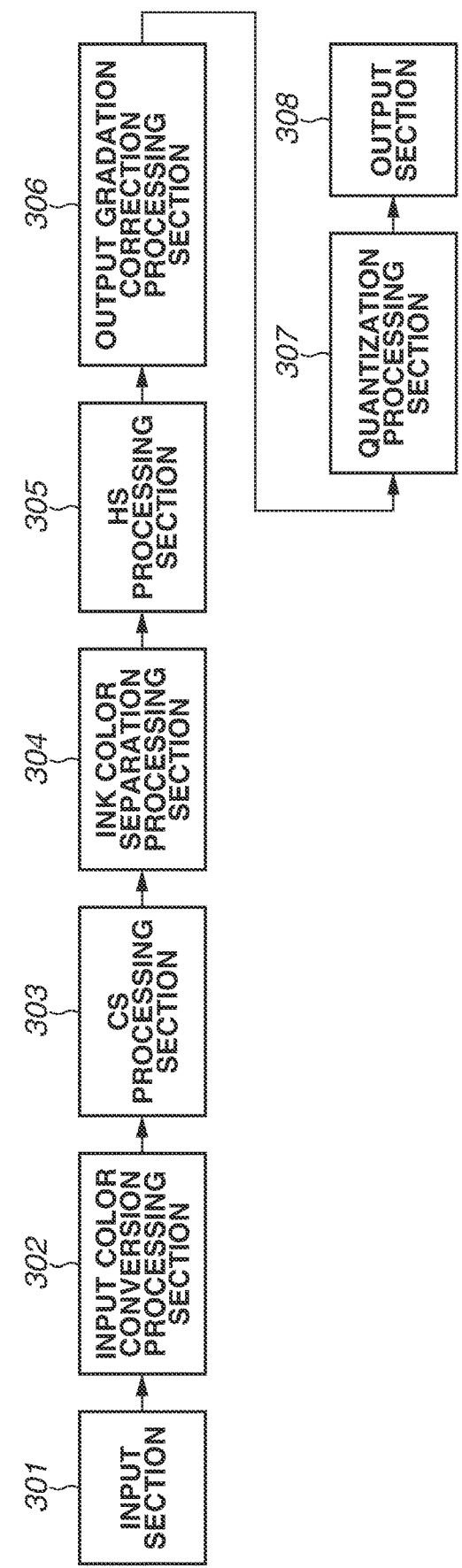
FIG. 3 is an explanatory diagram illustrating a conventional image conversion processing flow.

FIG. 3 is a block diagram illustrating a configuration of conventional image conversion processing. FIG. 3 illustrates steps up to conversion of input image data into recording data recordable by the recording apparatus. The image conversion processing illustrated in FIG. 3 includes an input color conversion processing section 302, a CS processing section 303, an ink color separation processing section 304, an HS processing section 305, an output gradation correction processing section 306, and a quantization processing section 307.

Color unevenness due to variations in the discharge characteristics and HS processing and CS processing for resolving the same will be described with reference to FIGS. 4A, 4B, 4C, and 4D. In FIGS. 4A to 4D, a color difference occurring between a plurality of areas obtained by dividing the recording medium 106 into a plurality of parts in the X direction (lateral direction in the diagrams) when recording a blue image expressed by superposition of cyan ink and magenta ink will be described.

Figure 4A:
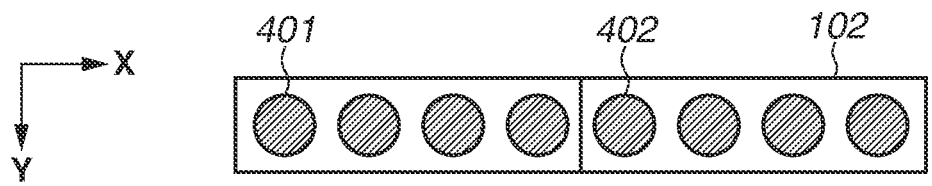
FIGS. 4A, 4B, 4C, and 4D are explanatory diagrams illustrating variations in a discharge characteristic, and head shading (HS) and color shading (CS) processing.
Figure 4B:
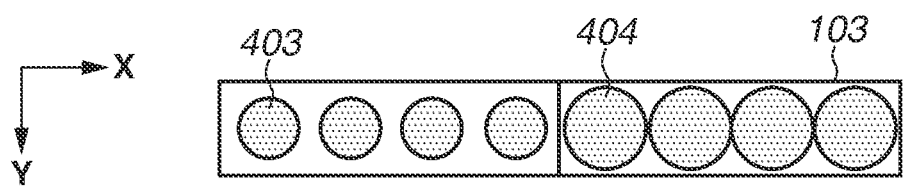
Figure 4C:
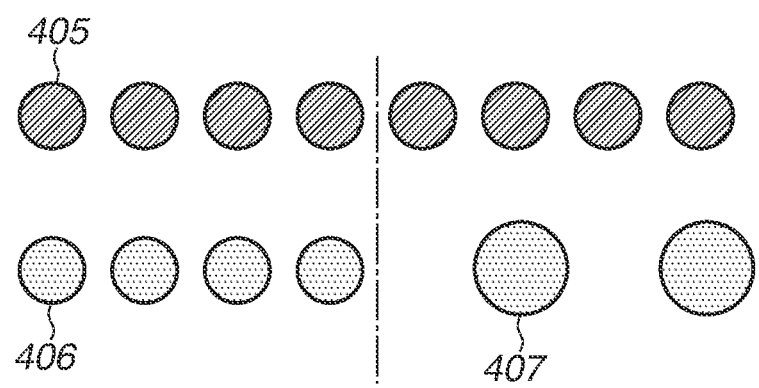
Figure 4D:
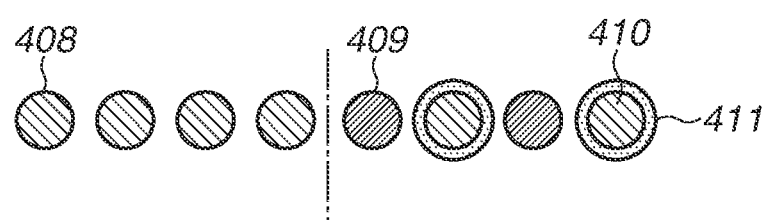

FIG. 4A is a diagram schematically illustrating the recording head 102 in which nozzles for discharging cyan ink are arranged. FIG. 4B is a diagram schematically illustrating the recording head 103 in which nozzles for discharging magenta ink are arranged. For simplicity of description, eight nozzles are illustrated here among the plurality of nozzles included in each recording head. FIG. 4C is a diagram for describing dots recorded by the recording heads 102 and 103 as a result of a dot adjustment made by the HS processing. FIG. 4D is a diagram illustrating the cyan dots and magenta dots illustrated in FIG. 4C in a superposed manner. FIGS. 4A to 4D illustrate the individual nozzles and the dots recorded by the respective nozzles in the same sizes. However, such a depiction is intended for the description of the correspondence therebetween. In fact, the nozzles and the dots are not the same in size. In FIGS. 4A to 4D, a nozzle having a small amount of discharge is represented by a small circle and a nozzle having a large amount of discharge is represented by a large circle for the purpose of description, whereas the amount of discharge from the nozzles can also vary due to a factor other than the nozzle sizes.

An area of the recording medium 106 where recording is performed by using the four left nozzles of the recording head 102 in FIG. 4A and the four left nozzles of the recording head 103 in FIG. 4B will be referred to as a first area. Similarly, an area where recording is performed by using the four right nozzles of the recording head 102 in FIG. 4A and the four right nozzles of the recording head 103 in FIG. 4B will be referred to as a second area. In this example, among the eight nozzles of the recording head 102 for discharging cyan ink, nozzles 401 corresponding to the first area and nozzles 402 corresponding to the second area can discharge a normal amount of ink in a normal direction. Thus, dots of the same size are formed on the recording medium 106 at constant distances. Among the eight nozzles of the recording head 103 for discharging magenta ink, nozzles 403 corresponding to the first area can discharge a normal amount of ink in a normal direction. Dots having substantially the same size as that of the cyan ink dots are formed on the recording medium 106 at constant distances. Nozzles 404 corresponding to the second area each have a greater amount of discharge than that of the nozzles 403. Thus, dots greater than the magenta ink dots formed in the first area are formed in the second area. If the recording heads 102 and 103 having such discharge characteristics are used, a cyan image has no difference in density between the first and second areas. However, a magenta image has a higher density in the second area than in the first area, and such a difference is visually observed as color unevenness. Color unevenness occurs due to such a difference in at least any one of density, lightness, saturation, and hue between adjoining areas. An image with color unevenness is visually observed to have different colors.

To record an image by using such recording heads having variations in the amount of discharge, image data correction based on the HS processing has conventionally been performed. FIG. 4C illustrates the dots after the HS processing-based correction. In this example, the number of recording dots in the image data corresponding to the four right nozzles 404 of the recording head 103 for discharging magenta ink is corrected to reduce density. More specifically, binary dot data determining whether to record dots is generated so that the number of dots formed by the nozzles 404 having a large amount of discharge becomes smaller than the number of dots formed by the nozzles 403 having a normal amount of discharge. With cyan ink, the same numbers of dots 405 having substantially the same size are formed in the first and second areas. With magenta ink, four dots 406 are formed in the first area while fewer dots (two dots in FIG. 4C) 407 than in the first area are formed in the second area with a greater size than that of the dots 406. In such a manner, if the nozzles have variations in the amount of discharge, the densities of the respective areas can be made equal by correcting the number of dots.

However, even if the density difference between the areas is resolved through the foregoing HS processing, an image containing a color (secondary color) formed by superposing dots of a plurality of colors can produce color unevenness. FIG. 4D is a diagram illustrating a blue image formed by applying the cyan dots and the magenta dots illustrated in FIG. 4C. In the first area, the cyan dots 405 of normal size and the magenta dots 406 of normal size are applied to the same pixels to form blue dots 408 of normal size. By contrast, the second area includes sole cyan dots 409 of normal size and blue dots formed by superposing cyan dots 405 of normal size and magenta dots 407 of large size. The blue dots formed by superposing the cyan dots 405 of normal size and the magenta dots 407 of large size include blue areas 410 where cyan ink and magenta ink are superposed, and surrounding magenta areas 411 formed of magenta ink. Thus, the second area is observed to have the sum of light absorption characteristics of the three types of areas, namely, the sole cyan dots 409, the blue areas 410 formed by mixing cyan and magenta colors, and the surrounding magenta areas 411. If the color of the second area is equal to the color observed from the light absorption characteristics of the blue dots 408 in the first area, the two areas are observed as images of almost the same colors. However, if an image has a multinary color (mixed color) formed by superposing a plurality of inks, the color observed from the light absorption characteristics of the image does not coincide with the color observed from the sum of the light absorption characteristics in the areas of the inks of the respective plurality of colors. As a result, the color formed by superposing the inks of the plurality of colors produces a color difference even if a density difference (color difference) between the areas is corrected through the HS processing with respect to each ink color. In the present example, the color of the blue image in the first area and that of the blue image in the second area are observed as different colors, i.e., visually recognized as color unevenness.

CS processing is performed to correct such color unevenness. The CS processing is processing intended to reduce a color difference unresolvable by the HS processing and further adjust the number of dots of each color in each area. In a case where a blue image is recorded by using cyan ink and magenta ink as described above, even if color unevenness is not resolved by only adjusting the numbers of cyan and magenta dots, the CS processing can resolve the color unevenness by adding inks of other colors such as yellow and black.

Referring back to the description of FIG. 3, initially, image data is input to an input section 301. The image data input here is 8-bit RGB luminance data expressed by three components R (red), G (green), and B (blue). In the input color conversion processing section 302, the input image data is converted into 8-bit device RGB luminance data, which is image data in a color space specific to the recording apparatus in which the recording apparatus can reproduce an image. The image data can be converted by using a conventional method such as referring to a lookup table (LUT) stored in a memory in advance. Then, in the CS processing section 303, conversion processing for correcting a local color difference is performed on the image data converted by the input color conversion processing section 302. Corrections are made to reduce color unevenness in each correction unit (area) by using a three-dimensional LUT as described with reference to FIGS. 4A, 4B, 4C, and 4D based on color unevenness detected by an inspection apparatus. Such CS processing can reduce the color difference, in a multinary color image formed by using inks of a plurality of colors, that is not fully corrected in the HS processing section 305 in a subsequent stage. Next, in the ink color separation processing section 304, the CS-processed image data including RGB values is separated into density data having eight bits for each of cyan (C), magenta (M), yellow (Y), and black (K) colors corresponding to the C, M, Y, and K, four color inks used in the recording apparatus. Here, four planes (four colors) of single channel images in the respective ink colors are generated. In the same way as in the input color conversion processing section 302, a conventional method such as referring to a LUT stored in a memory in advance can be used in the ink color separation processing section 304. In the HS processing section 305, the image data including C, M, Y, and K 8-bit density signal values obtained by color separation into ink color-specific signals is subjected to correction processing for suppressing density unevenness due to variations in the discharge characteristics of the nozzles provided in the recording heads 101 to 104. In the HS processing section 305, gradation conversion is performed on each of the ink color-specific four channels of signal values by using a one-dimensional LUT. As the three-dimensional LUT applied in the CS processing section 303 and the one-dimensional LUT applied in the HS processing section 305, different conversion tables are applied to respective correction units formed in units of one or a plurality of nozzles. For example, such conversion tables are generated for the respective correction units based on a result of the reading of the test pattern by the reading apparatus.

Next, in the output gradation correction processing section 306, output gradation correction for adjusting the numbers of dots for gradation expression on the recording medium 106 is performed on the image data including the HS-processed C, M, Y, and K 8-bit signal values. Here, the signal value of each ink color is converted by using a one-dimensional LUT. In the quantization processing section 307, quantization processing is applied to each plane of the C, M, Y, and K 8-bit density data on which the output gradation correction is performed. An error diffusion method or a dithering method is used as a quantization processing method. The quantization-processed data may be binary data or multivalued data having three or more values. In the case of binary data, the density data is converted into values indicating whether to record (ON) or not record (OFF) an ink dot in each pixel. In the case of multivalued data having three or more values, the multivalued data is further developed into binary data about whether to record (ON) or not record (OFF) an ink dot in each pixel by index development. Conventional techniques may be used for the index development. For example, a table of dot layouts corresponding to respective quantization levels may be stored in advance, and ONs and OFFs in a dot layout may be determined based on the quantization level.

As described above, various types of conversion processing are applied to the RGB data that is the original image data, whereby the RGB data is converted into binary data for the respective ink colors that defines whether the recording heads 101 to 104 perform recording. The converted data is output to an output section 308. The recording heads 101 to 104 apply ink droplets based on the output image data, whereby an image is recorded on the recording medium 106.

(Pure Colors and Pure Color Preservation)

The foregoing CS processing can interfere with preservation of pure colors. Since the CS processing multidimensionally corrects image data, image data preserving pure yellow color before the CS processing can be corrected through the CS processing into image data in which ink of a color other than yellow is used to record the image. In such a case, the user's demand to record a yellow image in the "pure color" of only the yellow ink cannot be met.

The user usually defines a color space and generates image data with the intention of obtaining a desirable printing result. A printing system applies input color conversion processing for converting the image data into the device-specific color space so that the user-specified colors can be favorably reproduced by the output device. To reproduce the user-intended colors by a single recording device, the same input color conversion processing can be applied to the entire page. Then, the printing system applies CS processing for correcting unevenness ascribable to the device. The CS processing can correct color unevenness to provide a favorable image, whereas ink of a color not expected by the user can get into an image area where pure colors are desired to be preserved. In view of this, in the present embodiment, processing for achieving both the CS processing-based color unevenness correction and the user's intention to preserve pure colors in a compatible manner is performed.

Figure 5:
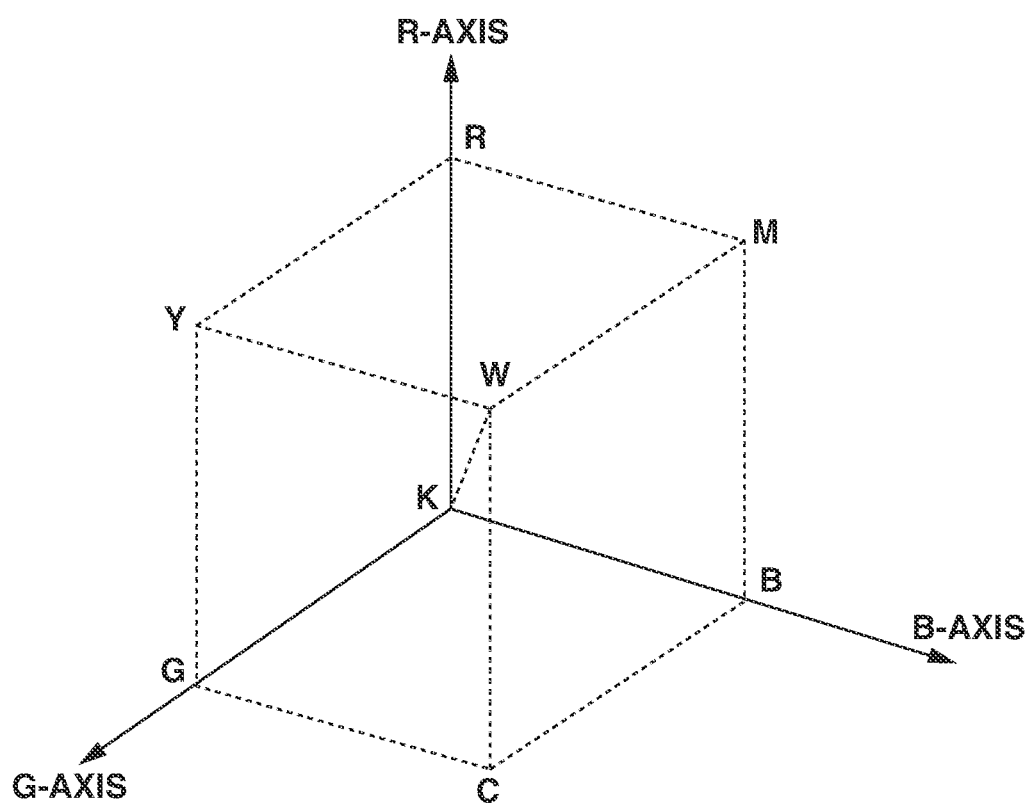
FIG. 5 is a diagram for describing a relationship between color and expression data in a red, green, and blue (RGB) color space.

FIG. 5 is a diagram for describing a color space defined in RGB. The RGB color space includes R-, G-, and B-, three axes. In 8-bit processing, each of the R-, G-, and B-axes can take a value of 0 to 255. A color is included in this color solid, with R, G, and B channels each taking any one of the values of 0 to 255. R=G=B=0 represents a black point (K). R=G=B=255 represents a white point (W). (R, G, B)=(255, 0, 0) represents the maximum value of red (R). A line connecting the white point and the red point is expressed by R=255 and G=B, where G and B take any one of the values of 0 to 255. (R, G, B)=(255, 255, 0) represents the maximum value of yellow (Y). A line connecting the white point and the yellow point is expressed by R=G=255, where B takes any one of the values of 0 to 255. A plane connecting W, Y, R, and M is expressed by R=255, where G and B take any of the values of 0 to 255. Similarly, (R, G, B)=(0, 255, 0) represents the maximum value of green (G). (R, G, B)=(0, 0, 255) represents the maximum value of blue (B). (R, G, B)=(0, 255, 255) represents the maximum value of cyan (C). (R, G, B)=(255, 0, 255) represents the maximum value of magenta (M). A line connecting the white point and the black point represents gray and is expressed by R=G=B, where R, G, and B take any one of the values of 0 to 255.

In the present embodiment, all the points lying within the three planes including the white point (W) in FIG. 5, i.e., all the points (colors) at which at least one of R, G, and B takes a value of 255 and the points (colors) on the gray line connecting the white point and the black point will be referred to as "pure colors". "Preserving" the "pure colors" in correction processing such as the CS processing refers to preventing an ink component of another color that causes turbidity of the correction-processed color from getting mixed in. For that purpose, only one or two types of inks are used at a time in recording an image by using the CMYK four color inks. Then, (1) the points on the planes including the white point (W) in the color space of FIG. 5 need to be located on the same planes after the color correction, and (2) the points on the lines including the white point (W) need to be located on the same lines after the color correction. More specifically, (1) the points on the three planes, namely, the plane connecting W, Y, R, and M, the plane connecting W, M, B, and C, and the plane connecting W, C, G, and Y need to be located on the same planes after the color correction processing. (2) The points on the four lines, namely, the line connecting the white point (W) and the yellow point (Y), the line connecting the white point (W) and the magenta point (M), the line connecting the white point (W) and the cyan point (C), and the line connecting the white point (W) and the black point (K) need to be located on the same lines after the color correction processing. In the present embodiment, to implement such pure color preservation, image data that preserves pure colors is generated by applying a color separation table intended for pure color preservation in converting the RGB data into the ink color-specific image data in the ink color separation processing section 304.

The color separation table intended for pure color preservation in the recording method using CMYK four color inks will be described. A color separation table defines amounts of inks of respective CMYK colors corresponding to input RGB data. As described above, the color separation table for pure color preservation according to the present embodiment is defined so that only the cyan ink is used to express a color (R, G, B)=(0, 255, 255), i.e., the color representing the maximum value of the cyan (C) hue. Similarly, the color separation table is defined so that only the magenta ink is used to expresses a color (R, G, B)=(255, 0, 255), i.e., the color representing the maximum value of the magenta (M) hue. Similarly, the color separation table is defined so that only the yellow ink is used to expresses a color (R, G, B)=(255, 255, 0), i.e., the color representing the maximum value of the yellow (Y) hue. Similarly, the color separation table is defined so that only the black ink is used to express a color (R, G, B)=(0, 0, 0), i.e., black (K). In addition, the color separation table is defined to use only the inks of the respective hues in expressing the colors of the points on the lines connecting the white point and C, M, Y, and K. Such a color for which only one ink is defined to be used will be referred to as a "primary color". In the present embodiment, a pure color is preserved by restricting inks to be used so that only one ink of the corresponding hue is used in expressing a primary pure color. For example, if the cyan ink or the magenta ink is used in an image of yellow color that is the primary color, the pure color can be said to not be preserved.

In the present embodiment, a color expressed by using any two of C, M, and Y inks will also be called the pure color and referred to as a "secondary color". The foregoing color separation table restricts the inks to be used so that such secondary pure color is also preserved. For example, only the magenta ink and the yellow ink are defined to be used to express a color of (R, G, B)=(255, 0, 0), i.e., red (R). Similarly, the magenta ink and the yellow ink are also defined to be used to print a color expressed by (R, G, B)=(255, 128, 0), i.e., an orange color between red and yellow. In the present embodiment, the pure color is preserved by restricting the inks to be used so that only two types of inks defined in the color separation table are used to express the secondary pure color. Thus, an image of red color, which is a secondary color, can be said to preserve its pure color if formed by using only the magenta ink and the yellow ink, and not preserve its pure color if cyan ink, which is a complementary color to red, is used.

Next, pure color preservation in a case where a plurality of types of inks of similar colors to the CMYK inks are used in addition to the CMYK four colors will be described. An example is a case where inks having lower color material densities, or light-color inks, are used. In such a case, inks of similar colors are regarded as a single type of ink. For example, if cyan ink of normal density and light cyan ink of lower density are used, an image of cyan (C) color, which is at (R, G, B)=(0, 255, 255), may be expressed by using both the cyan ink and the light cyan ink. Since such inks are of similar colors and do not cause color turbidity due to complementary colors, the pure color is preserved. If a complementary color ink such as the magenta ink, the light magenta ink, or the yellow ink is used at the same time, the pure color is not preserved. The pure color is also preserved if three types of inks including the magenta ink of normal density, the light magenta ink, and the yellow ink are used to express an image of red (R) color, which is at (R, G, B)=(255, 0, 0). The pure color is not preserved if a complementary color ink such as the cyan ink or the light cyan ink is used at the same time. The same applies to the black ink and the gray ink, which is achromatic ink having a lower density than that of the black ink. A pure color can be said to be preserved if an image on the gray line of R=G=B is recorded by using the black ink and the gray ink. Pure colors are also regarded as being preserved if three or more types of inks having the same hue and different densities are used.

Next, pure color preservation in a case where inks of special colors (spot color inks) such as orange, red, green, violet, and blue are used in addition to the CMYK four colors will be described. Even in such a case, inks of the same hue are regarded as a single type of ink. For example, if the green ink is used, an image of green (G) color, which is at (R, G, B)=(0, 255, 0), can be expressed by using the single color of green ink. Alternatively, a green color may be expressed by using the cyan ink and the yellow ink. In such a case, the green ink and the green expressed by using the two colors of cyan and yellow inks have the same hue, and therefore do not cause color turbidity due to complementary colors. Then, a pure color is preserved if an image of green color is formed by using the green ink, the cyan ink, and the yellow ink. The pure color is not preserved if the magenta ink, which is a complementary color, is used at the same time. The same applies when the red ink or the blue ink is used at the same time.

One or a plurality of "pure colors" to be preserved can be selected as appropriate from the foregoing ones based on a state of the recording apparatus, contents, and user specifications. The definition of pure colors may be limited to only primary colors. Whether to include the foregoing secondary colors, light-color inks, and spot color inks in the pure colors may be freely set. The pure colors may include only colors having the maximum saturations in the respective hues. Hues may be limited to specific ones based on user specifications.

In a case where the input image data is not in the RGB color space but in the CMYK color space, a color is regarded as a "pure color" if any one channel or any two channels other than K has/have a value of 0 to 255 and the remaining channels have a value of 0. The pure color is preserved if the ink(s) of the color(s) corresponding to the channel(s) is/are used without the inks of the colors corresponding to the channels having a value of 0.

(Relationship Between CS Processing and Pure Color Preservation)

Figure 6A:
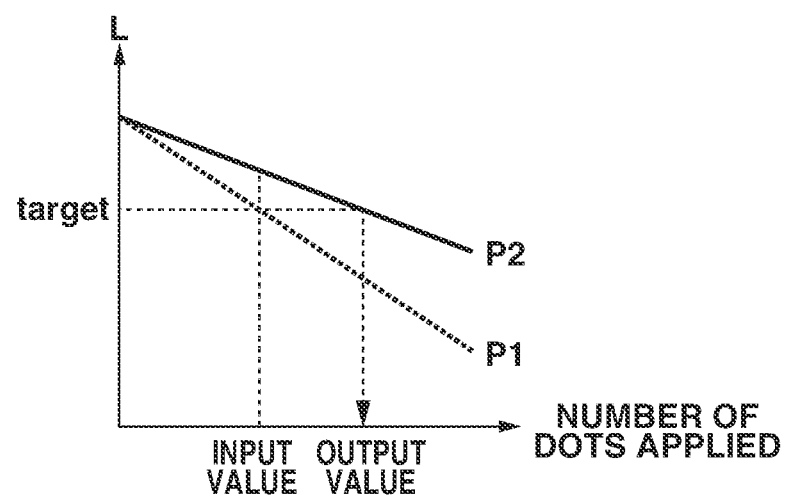
FIGS. 6A, 6B, and 6C are charts for describing a color shift in a case where pure colors are not preserved.
Figure 6B:
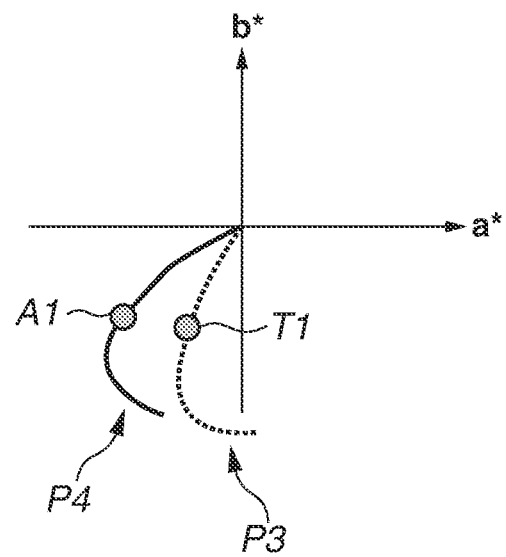
Figure 6C:
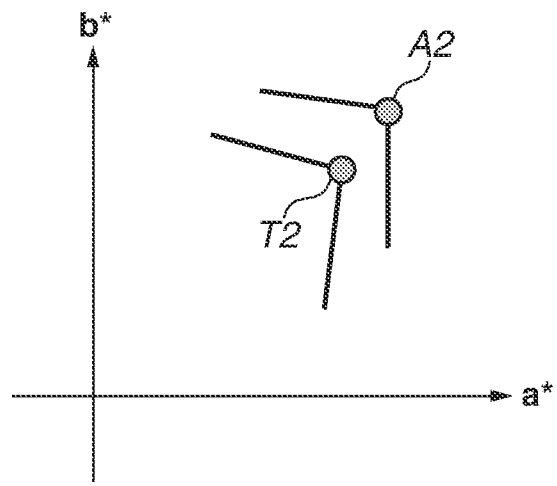

Next, it is described that the CS processing does not preserve pure colors in some cases with reference to FIGS. 6A, 6B, and 6C. FIGS. 6A and 6B are charts illustrating measurement values of colors presented when the same cyan ink is applied to the same recording medium 106 by using two recording heads having different amounts of discharge. In FIG. 6A, the horizontal axis indicates the number of dots applied to the recording medium 106. The vertical axis indicates the lightness component, or the L component in the International Commission on Illumination (CIE)-L*a*b* in particular, of the color presented in that case. A plot P1 represents the lightness of an image recorded by using a recording head having a large amount of discharge. A plot P2 represents the lightness of an image recorded by using a recording head having a small amount of discharge. As can be seen from the diagram, the image recorded by using the recording head having a small amount of discharge indicates higher lightness for the same number of dots. In FIG. 6B, the horizontal axis is the a* axis of the CIE-L*a*b*, and the vertical axis the b* axis of the CIE-L*a*b*. Plots P3 and P4 represent colors when the number of dots applied is gradually increased from a point where no ink is recorded, i.e., the paper white of the recording medium 106 to where the maximum amount of ink dots allowable for the recording medium 106 is applied. The plot P3 represents the color recorded by the recording head having a large amount of discharge. The plot P4 represents the color recorded by the recording head having a small amount of discharge. The different amounts of discharge yield different dot sizes and different states of dot formation on the sheet surface. Thus, as illustrated in FIG. 6B, the two curves do not coincide.

Matching of cyan halftone colors by using such two recording heads will be described. For example, take a case of matching a color recorded with only the cyan ink by using the recording head having a small amount of discharge to a target value, with a color recorded with only the cyan ink by using the recording head having a large amount of discharge as the target value. As illustrated in FIG. 6A, the lightness L* can be matched by increasing the number of applied dots as in the conventional HS processing. However, as illustrated in FIG. 6B, a color A1 recorded by the recording head having a small amount of discharge is unable to be brought close to or matched with a target color T1 recorded by the recording head having a large amount of discharge by simply adjusting the number of cyan ink dots applied. The reason is that the colors only move on the respective plot curves if the number of dots is adjusted. Thus, the recording heads having different amounts of discharge are not capable of color matching by simply adjusting the amount of ink applied. For color matching, ink dots of other color (in this case, magenta dots) need to be used.

Such a color difference due to variations in the amount of discharge also occurs in a secondary color image recorded by using inks of a plurality of colors. FIG. 6C is a chart illustrating colors near red when the same numbers of dots are applied to the same recording medium 106 by using recording heads having different amounts of discharge. As in FIG. 6B, the horizontal axis indicates a*, and the vertical axis indicates b*. A target color T2 represents a measurement value of a red image formed by using a magenta recording head having a normal amount of discharge and a yellow recording head having a normal amount of discharge. A red color A2 represents a measurement value of a red image formed by using a magenta recording head having a greater amount of discharge than the normal amount of discharge and a yellow recording head having a greater amount of discharge than the normal amount of discharge. In a case where the CS processing is applied to the image data to be recorded by using the recording heads that present the red color A2 having higher saturation than that of the target color T2, to bring the red color A2 closer to the target color T2, a correction is made to lower the saturation by applying the cyan ink, which is an ink of complementary color to red.

As described above, reducing color unevenness through the CS processing can involve applying ink of a different color from that of the ink(s) originally constituting the color, whether it is a primary color image formed by one type of ink or a secondary color image formed by two or more types of inks. In other words, the CS processing is capable of matching the color with the target color but may fail to preserve the pure colors. If the pure colors are not preserved, use of inks of other colors (complementary colors in particular) can make image granularities more noticeable. If CS processing intended for pure color preservation is performed on a yellow image, values of a CS processing table (CS table) are set so that only yellow ink is used for the image as described above. If CS processing intended for color unevenness correction rather than pure color preservation is performed on a yellow image, values of a CS processing table are set so that inks of other colors such as the cyan ink and the magenta ink are used for the image aside from the yellow ink.

The use of inks of other colors can lower the sharpness of the image if recording positions of different ink colors are misregistered. For example, in a case where in recording a character of achromatic color (for example, black character) by using an achromatic ink such as the black ink and the gray ink, a correction is made to use chromatic inks in the CS processing. If misregistration occurs between the achromatic ink and the chromatic inks, other colors appear on the contour of the black character, resulting in a drop in the quality of the black character. In such a case, the use of chromatic inks in the achromatic image needs to be avoided in the CS processing.

A recording apparatus that records an image by a single recording scan by using a full-line head in which nozzles are arranged in a direction orthogonal to the conveyance direction of a recording medium is likely to produce noticeable granularities if pure colors are not preserved. The granularities are particularly noticeable compared to those of a serial recording apparatus that records an image over a plurality of scans by using a head in which nozzles are arranged in the conveyance direction. The full-line multiple head recording apparatus makes CS corrections in predetermined correction units in the direction of arrangement of the nozzles based on variations in the amounts of discharge of the nozzles. The correction amounts in the CS corrections vary from one correction unit to another since an image is recorded by one scan. Thus, the correction units have different correction values, and the degree of noticeability of granularities also varies from one correction unit to another. Such difference in the degree of noticeability of granularity are visually observed as unevenness in the recorded image.

As described above, the CS processing is capable of correcting color unevenness due to variations in the discharge characteristics, but may fail to preserve the pure colors if pure color preservation is intended by the user or in recording contents for which pure color preservation is intended. On the other hand, some users such as a user who do not intend to preserve the pure colors can desire to reduce color unevenness by performing CS processing with high precision and matching colors as much as possible without restricting the application of other color inks. A recording document can include various colors and contents, with a mixture of images for which pure color preservation is desired and ones for which pure color preservation is not desired. Contents rich in gradation, such as a picture, include less "solid" regions including wide areas of identical colors, and do not have much need for pure color preservation. In such a case, color unevenness is desired to be reduced with high precision since granularities and a drop in sharpness due to misregistration do not matter much even without pure color preservation. On the other hand, if contents include wide areas of a single color, such as in characters, graphics, and logos, granularities due to the application of other color inks and a drop in sharpness due to misregistration tend to matter much. In such a case, the pure colors are desired to be preserved even with the cost of some drop in the precision of color unevenness reduction by the CS processing. If there are both images for which pure color preservation is desired and for which pure color preservation is not desired as described above, different pieces of color correction information can be used image by image. More specifically, an optimum recording image can be generated by properly using CS processing in which a CS table (first information) intended for pure color preservation is used and CS processing in which a CS table (second information) intended for pure color non-preservation, or high-precision correction of color unevenness, is used.

(Pure Color Preserving CS Processing and Pure Color Non-Preserving CS Processing)

Figure 7A:
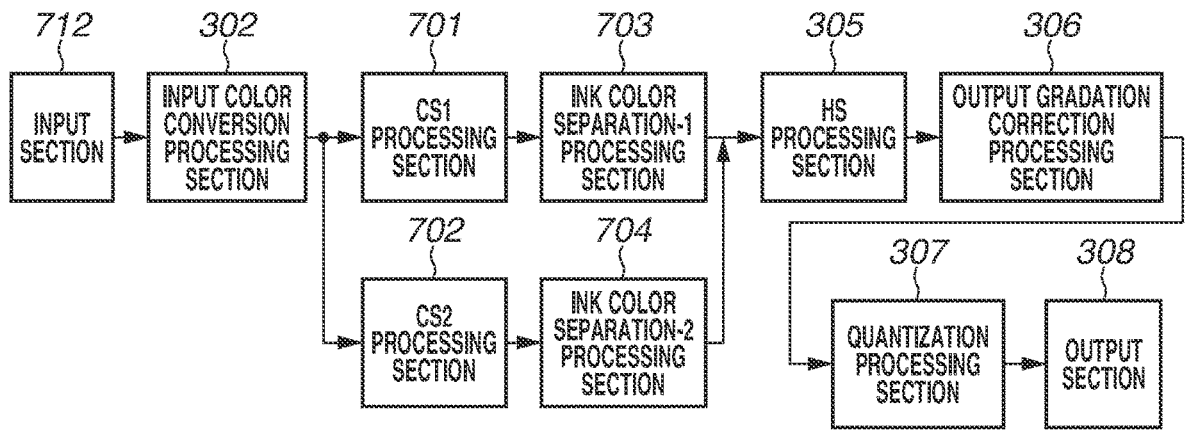
FIGS. 7A, 7B, 7C, 7D, and 7E are explanatory diagrams illustrating image conversion processing flows according to a first embodiment.

Now, configurations of image conversion processing characteristic to the present embodiment will be described with reference to FIGS. 7A, 7B, 7C, 7D, and 7E. FIG. 7A is a block diagram illustrating a configuration of image conversion processing according to the present embodiment. An original image to be printed is converted into image data recordable by the recording apparatus through the image conversion processing. The image conversion processing includes an input color conversion processing section 302, a CS1 processing section 701, a CS2 processing section 702, an ink color separation-1 processing section 703, an ink color separation-2 processing section 704, an HS processing section 305, an output gradation correction processing section 306, and a quantization processing section 307. Processing sections similar to those of FIG. 3 are designated by the same reference numerals.

The input color conversion processing section 302 will be described in detail. The user generates image data by defining the image data in a RGB color space or a CMYK color space. A color to be reproduced by the same RGB values or the CMYK values varies depending on what color space is defined to generate the image data. In the case of RGB data, typical definition color spaces include sRGB and Adobe RGB color spaces. In the case of CMYK data, known definition color spaces include a Japan Color color space. Such color space standards are intended to associate input RGB data or CMYK data with a device-independent color space (such as CIE-L*a*b* and XYZ). Correspondences between color numbers defined by color material manufacturers and device-independent color spaces are also defined. By taking such correspondences into account, the user generates the image data so that an image of desired color is obtained.

In the input color conversion processing section 302, the user's image data defined in RGB, CMYK, or color numbers is converted into 8-bit luminance data in a device RGB color space that is the color space specific to the recording apparatus. To reproduce the user-intended colors defined in the image data by a single recording device, the same input color conversion processing can be applied to the entire page regardless of whether pure color preservation is intended. This processing may appear to be needless if the input data is CMYK data as in a processing flow to be described below where the color space specific to the recording apparatus is a device CMYK color space. However, the colors expected from the CMYK values of the input data do not necessarily coincide with the CMYK colors of the inks of the recording apparatus. Thus, the input color conversion processing in the input color conversion processing section 302 is needed.

Next, the CS1 processing section 701 and the CS2 processing section 702 will be described. As described above, the CS processing is color correction processing for correcting color unevenness due to variations in the discharge characteristics of the recording elements and fluctuations thereof, and uses color correction information in the form of tables. If the same recording apparatus is used, it may seem sufficient to perform one type of CS processing as in the configuration illustrated in FIG. 3. However, print products include various contents, and there are various user demands. Some images need high-precision color unevenness correction, and others need pure color preservation. In particular, if both types of images are included in the same page, the two types of CS processing need to be properly used to satisfy both demands in a compatible manner.

As described above, images to preserve pure colors and images to correct color unevenness with high precision are recorded by using a plurality of colors of inks in different combinations. Thus, different processes are performed so that different types of inks are selected. Ink types are supposed to be selected in the ink color separation processing section. In a possible image processing flow, the same input color conversion processing and the same CS processing may be performed on image data before the processing branches into an ink color separation process intended for pure color preservation and an ink color separation process not intended for pure color preservation. However, once the same CS processing is performed by using a pure color non-preservation table not intended for pure color preservation as described above, pure colors will not be preserved even by the subsequent ink color separation process intended for pure color preservation. On the other hand, if the same input data is subjected to ink color separation processes with different definitions of ink types or amounts, the image can be recorded in different colors. This interferes with the reduction of color unevenness because even if the CS processing for reducing color unevenness is applied in response to one ink color separation process, the other ink color separation process produces different colors. Thus, processing that only branches into different ink color separation processes after the entire image data is processed in one color conversion processing section and one CS processing section is not able to provide a favorable image.

To solve such an issue, in the present embodiment, a plurality of CS processing sections and a respective plurality of color separation processing sections are provided as illustrated in FIG. 7A. Such processing sections are configurations for performing color correction with high precision and for preforming color correction with pure color preservation, and the processing is appropriately divided based on the image. The configurations for performing color correction with pure color preservation need to use pure color preservation tables intended for pure color preservation as the color correction information both in the CS processing and the color separation processing.

Initially, original image data to be printed and switch flags for determining which CS processing is subsequently performed are input to an input section 712. The switch flags are attached in units of any of the following: contents within the page, areas, and pixels. The original image data is 8-bit luminance data expressed in RGB. A switch flag includes at least one or more bits of data for selecting the subsequent processing flow. Then, in the input color conversion processing section 302, the input image data is converted into 8-bit luminance data in the device RGB color space that is the color space specific to the recording apparatus. Since the recording apparatus is the same, the same conversion processing is performed in the input color conversion processing section 302 regardless of the selection of the subsequent processing by the switch flags.

Next, CS processing is performed in one of the CS1 and CS2 processing sections 701 and 702 based on the switch flags attached to the input image data. After the processing (CS1 processing) in the CS1 processing section 701, the RGB data is converted into density data for the CMYK four colors, which are the ink colors of the recording apparatus, in the ink color separation-1 processing section 703 (ink color separation-1 processing). After the processing (CS2 processing) in the CS2 processing section 702, the RGB data is converted into density data for the CMYK four colors, which are the ink colors of the recording apparatus, in the ink color separation-2 processing section 704 (ink color separation-2 processing). Similar to the image processing configuration illustrated in FIG. 3, the density data separated by ink color is converted into data recordable by the recording apparatus through the processing of the HS processing section 305, the output gradation correction processing section 306, and the quantization processing section 307, and output to the recording apparatus.

Similar to the conventional CS processing and ink color separation processing, the CS1 processing in the CS1 processing section 701 and the ink color separation-1 processing in the ink color separation-1 processing section 703 correct color unevenness with high precision. The CS1 processing is processing intended to match colors without restricting the ink types to be used for recording. By contrast, the CS2 processing in the CS2 processing section 702 and the ink color separation-2 processing in the ink color separation-2 processing correct color unevenness while preserving pure colors. The CS2 processing is processing in which the ink types to be used in recording specific colors defined as pure colors as described above are restricted so that higher priority is given to the restriction on the ink types to be used than to color matching. This prevents inks of unintended other colors from being applied to the colors defined as pure colors, whereby granularities and a drop in sharpness due to misregistration are suppressed. The color separation tables used in the ink color separation-1 processing section 703 and the ink color separation-2 processing section 704 subsequent to such CS processing may be the same or different ones. The color separation table applied in the ink color separation-2 processing section 704 subsequent to the CS2 processing needs to be one for preserving pure colors as described above.

As described above, color unevenness of the image data to which the CS1 processing and the ink color separation-1 processing are applied is corrected with high precision. Color unevenness of the image data to which the CS2 processing and the ink color separation-2 processing are applied is corrected while preserving pure colors.

Figure 7B:
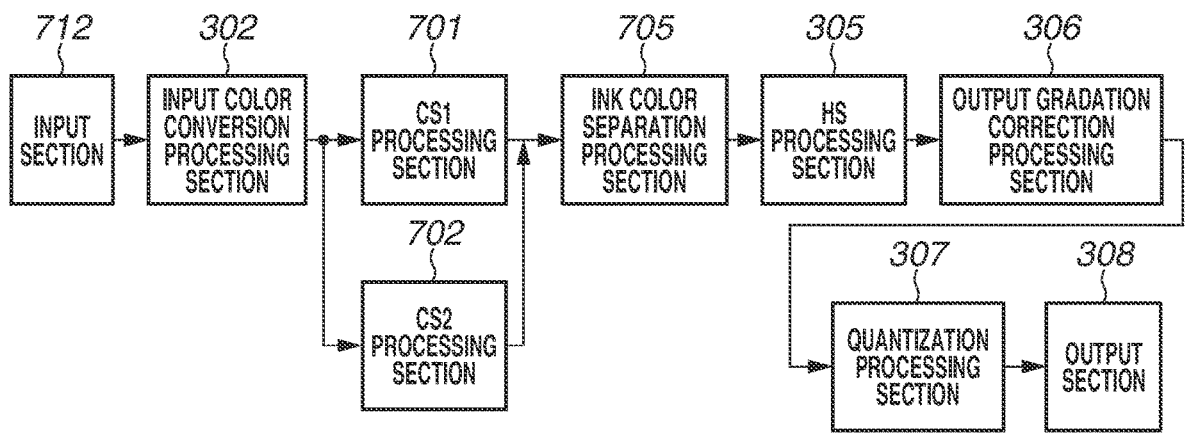
Figure 7C:
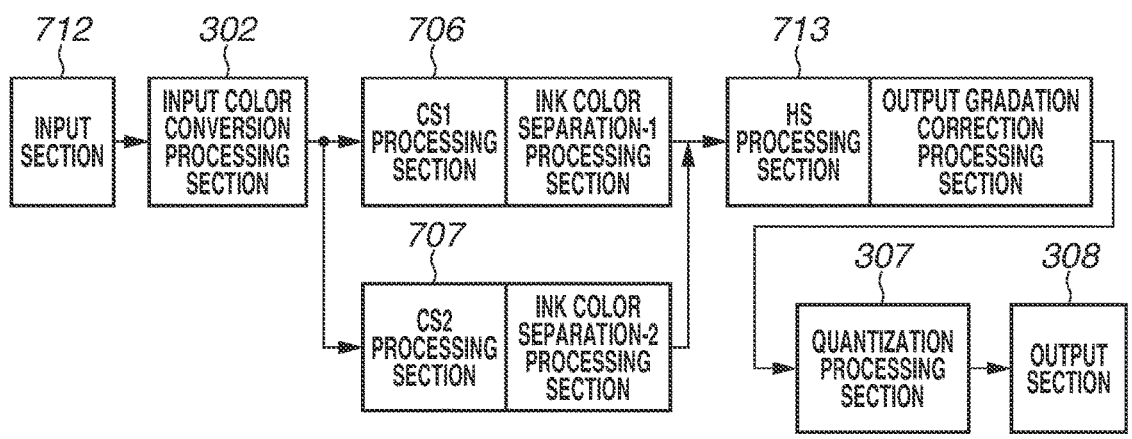
Figure 7D:
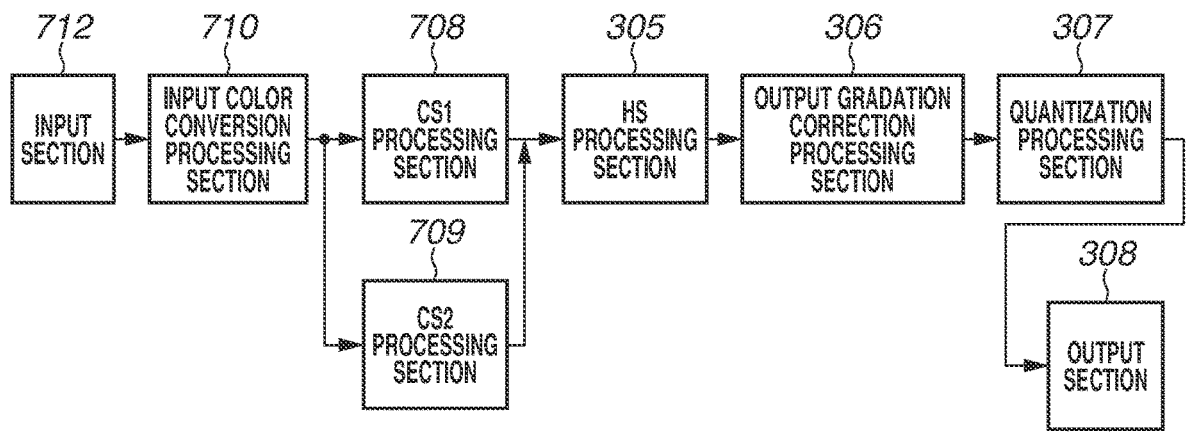

Next, modifications of the present embodiment will be described with reference to FIGS. 7B, 7C, and 7D. FIG. 7B illustrates a configuration including an ink color separation processing section 705 common to the CS1 processing section 701 and the CS2 processing section 702. In this configuration, a color separation table intended for pure color preservation needs to be applied to the ink color separation processing section 705. As illustrated in FIG. 7C, a composite processing section 706 integrating the CS1 processing section 701 and the ink color separation-1 processing section 703, a composite processing section 707 integrating the CS2 processing section 702 and the ink color separation-2 processing section 704, and a composite processing section 713 integrating the HS processing section 305 and the output gradation correction processing section 306 may be provided. In such a case, a conversion table applied to the composite processing section 706 is a table obtained by combining a conversion table applied to the CS1 processing section 701 and the color separation table applied to the ink color separation-1 processing section 703. This combined table is used to convert the image data after the input color conversion. A conversion table applied to the composite processing section 707 is a table obtained by combining a conversion table applied to the CS2 processing section 702 and the color separation table applied to the ink color separation-2 processing section 704. This combined table is used to convert the image data after the input color conversion. A conversion table applied to the composite processing section 713 is a table obtained by combining a conversion table applied to the HS processing unit 305 and the conversion table applied to the output gradation correction processing section 306. This combined table is used to convert the image data after the ink color separation process. To enable color unevenness and density unevenness corrections, different combined tables are used from one correction unit to another. The conversion tables applied to the composite processing section 706 are configured to correct color unevenness with high precision without restricting the ink types to be used for recording. The conversion tables applied to the composite processing section 707 are configured to correct color unevenness while preserving pure colors.

Figure 7E:
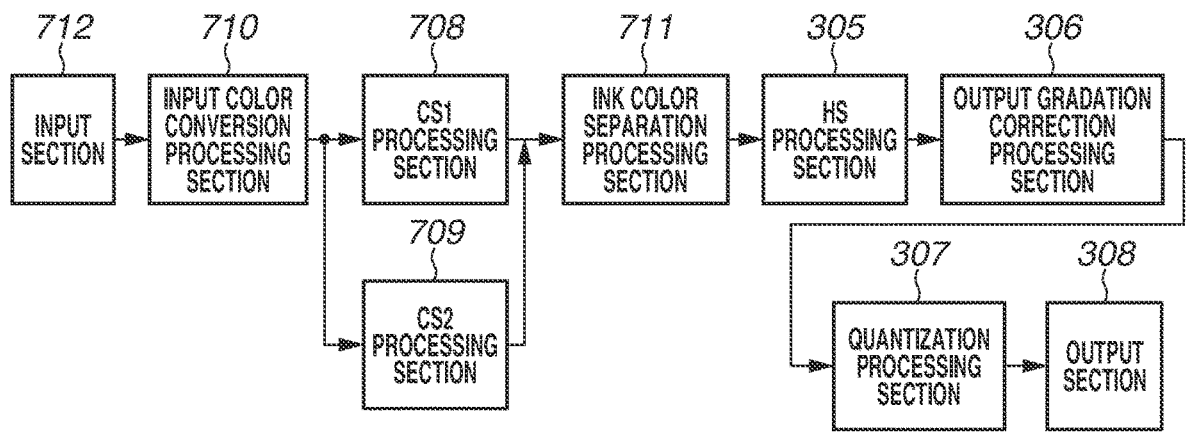

In the foregoing example, the image data input to the CS processing section 303 is described to be in the RGB format. However, the image data may be CMYK data. FIG. 7D illustrates a processing flow in such a case. In an input color conversion processing section 710, an input image in which pixel data is specified in RGB, CMYK, or color numbers is converted to output luminance data having eight bits for each of C, M, Y, and K colors. The converted CMYK data is data in the device CMYK color space that is the color space specific to the recording apparatus. Then, conversion is performed in a CS1 processing section 708 or a CS2 processing section 709 based on a predetermined condition. The CS1 processing section 708 is processing for correcting color unevenness with high precision without restricting the ink types to be used for recording. The CS2 processing section 709 is processing for correcting color unevenness while preserving pure colors. The data output from each of the CS processing sections is image data expressed in CMYK. Since the image data at this stage is already separated into density data in CMYK four colors, which are the ink colors of the recording apparatus, HS processing is performed without ink color separation processing. If the recording apparatus is equipped with light-color inks in addition to the basic CMYK inks, as illustrated in FIG. 7E, an ink color separation processing section 711 may be provided after the CS1 processing section 708 and the CS2 processing section 709. If light C (Lc), light M (Lm), and gray (Gr) inks are provided in addition to the CMYK inks, the input CMYK data is converted into data having eight bits for each of C, M, Y, K, Lc, Lm, and Gr colors in the ink color separation processing section 711. At this stage, seven planes (seven colors) of single channel images in the respective colors are generated.

In any of the processing flows, input image data is converted into data in the color space specific to the recording apparatus in the common input color conversion processing section before the processing branches based on a predetermined condition, and respective appropriate CS processes are performed thereon. The provision of a plurality of CS processes, or the processing for correcting color unevenness with high precision without restricting the types of inks to be used for recording and the processing for correcting color unevenness while preserving pure colors by restricting the types of inks to be used for recording in particular, produces the advantageous effects of the present embodiment.

FIGS. 8A and 8B illustrate examples of the conversion tables applied to the CS processing in the image processing flows described with reference to FIGS. 7A and 7B. Here, conversion tables for converting RGB 8-bit image data into similar RGB 8-bit image data will be described. Table 1 is a table for defining input data. Tables 2 and 3 are tables for defining output data. For example, in a case where data (R, G, B)=(0, 0, 16) is input, the values are defined in the second row of Table 1 from the top, whereby output values are determined by referring to the same location in Table 2 or 3. If Table 2 is used, the converted values are (R, G, B)=(1, 0, 14). Table 1 is defined by R, G, and B, and configured in a predetermined order. In the present embodiment, the signal values of the R, G, and B colors take a value of 0 to 255 each. Table 1 includes values obtained by substantially equally dividing the range of 0 to 255 into 17 grid points. Starting at R=G=B=0, values obtained by increasing the value of the B channel from 0 to 255 in steps of 16 (except the last step of 15) are initially set. Next, with the value of the G channel set to 16, values obtained by similarly increasing the value of the B channel from 0 to 255 in steps of 16 (except the last step of 15) are set. With the value of the G channel further increased by 16, values obtained by increasing the value of the B channel from 0 to 255 in steps of 16 (except the last step of 15) are set. Such a procedure is repeated until the value of the G channel reaches 255. Next, values are set by increasing the value of the R channel from 0 to 255 in steps of 16 (except the last step of 15). The procedure is repeated until the values R=G=B=255 are finally set, whereby values are set at each of 17×17×17=4913 grid points. (R, G, B)=(0, 0, 0) represents K. (R, G, B)=(255, 255, 255) represents white.

Table 2 is a conversion table intended for the CS1 processing. Table 3 is a conversion table intended for the CS2 processing. A difference between the two conversion tables is whether pure colors are preserved. Input values (R, G, B)=(255, 255, 0) represent yellow of the highest saturation. Suppose that the color reproduced by the values (R, G, B)=(255, 254, 1) illustrated in Table 2 minimizes the color difference from the foregoing yellow because of factors such as variations in the amount of discharge and a color target. If these values defined by Table 2 are output and a color conversion table intended for pure color conversion is used in the subsequent color separation processing, small amounts of magenta ink and cyan ink are applied in addition to yellow ink. More specifically, the color difference decreases but the pure color is not preserved. By contrast, if the values (R, G, B)=(255, 255, 1) defined by Table 3 are output, the inks to be used are limited to yellow ink and the pure color is preserved without magenta ink or cyan ink getting mixed in. As described above, signal values of R=G=255 with B having any of the values of 0 to 255 express any one of the colors on the line connecting white and yellow, and the recorded image is formed by using only yellow ink. In generating Table 2, the R, G, and B values are selected to reduce a color difference from the target color. In generating Table 3, the R, G, and B values are selected to reduce a color difference from the target color with a restriction that R=G=255 so that pure yellow color is preserved.

Input values (R, G, B)=(255, 16, 16) represent red slightly lighter than red of the highest saturation. As illustrated in Table 2, suppose that values (R, G, B)=(254, 15, 17) are selected if the R, G, and B values are selected to reduce a color difference from the target value. This reduces a color difference between the reproduced color and the target color, whereby color unevenness is corrected. However, the resulting data is such that a small amount of cyan ink is applied in addition to magenta ink and yellow ink. By contrast, if values (R, G, B)=(255, 15, 15) are output as illustrated in Table 3, the pure color is preserved by the restriction that only magenta ink and yellow ink are used without the application of cyan ink. As described above, a color with a signal value of R=255 expresses any one of the colors on the plane including W, M, R, and Y, and is formed by using only magenta and yellow inks. In generating Table 3, the R, G, and B values are selected to reduce a color difference from the target color with the restriction that R=255 so that pure red color is preserved.

Next, colors on the gray line connecting the white and black points will be described. If the input data is R=G=B, the color falls on a point on the gray line. For example, (R, G, B)=(16, 16, 16) represent dark gray. Suppose that the R. G, and B values selected to reduce a color difference from the target color are (R, G, B)=(15, 14, 16) as illustrated in Table 2. The resulting color is close to the gray line but has a slight saturation. If pure color preservation is intended, (R, G, B)=(15, 15, 15) are selected as illustrated in Table 3. Such signal values enable printing of a color having a small color difference from the target color under the restriction of R=G=B, i.e., being an achromatic color. A color having a small color difference from the target color is thereby selected with pure color preservation.

If the same ink color separation table is applied to the ink color separation-1 processing and the ink color separation-2 processing subsequent to the CS1 processing and the CS2 processing, the conversion tables for CS processing Table 2 and Table 3 provide substantially the same values for colors for which pure color preservation is not intended. This shall not apply if different tables are used for the ink color separation processing. In either case, in generating Table 2 applied to the CS1 processing not intended for pure color preservation, the R, G, and B values can be selected to reduce color differences from the target colors with no particular restriction. By contrast, in generating Table 3 applied to the CS2 processing intended for pure color preservation, the R, G, and B values are selected to reduce color differences from the target colors with a restriction on the R, G, and B values so that inks of other colors are not added during ink color separation.

Conversion tables such as Tables 2 and 3 are provided for each discharge amount rank. The conversion tables used in the CS1 processing correct color unevenness with high precision without restricting the types of inks to be used. The conversion tables used in the CS2 processing correct color unevenness with a restriction on the types of inks to be used so that inks of other colors are not applied to specific colors defined as pure colors.

FIG. 8B illustrates conversion tables to be used in an image processing flow in which the CS processing sections and the ink color separation processing sections are integrated as described with reference to FIG. 7C. Image data input to the conversion tables is RGB data, and output values are CMYK data. In the output CMYK data, "0" means that no ink is applied. Table 4 is a conversion table applied in the CS1 processing. Table 5 is a conversion table applied in the CS2 processing. As described above, input values (R, G, B)=(255, 255, 0) represent yellow of the highest saturation. As illustrated in Table 4, suppose that a color reproducible by data (C, M, Y, K)=(1, 1, 240, 0) minimizes the color difference from the target color because of factors such as variations in the amount of discharge and a color target. However, such values constitute data such that small amounts of magenta ink and cyan ink are applied in addition to yellow ink. By contrast, if values (C, M, Y, K)=(0, 0, 241, 0) are output as illustrated in Table 5, the pure color is preserved by the restriction that only yellow ink is used without the application of magenta ink or cyan ink. In generating Table 4, the C, M, Y, and K values are selected to reduce a color difference from the target color. In generating Table 5, the C, M, Y, and K values are selected to reduce a color difference from the target color under the restriction that C=M=K=0 so that pure yellow color is preserved.

Input values (R, G, B)=(255, 16, 16) represent red slightly lighter than red of the highest saturation. Again, suppose that the R, G, and B values selected to reduce a color difference from the target color are (C, M, Y, K)=(2, 238, 240, 0) as illustrated in Table 4. This reduces a color difference between the reproduced color and the target color, whereby color unevenness is corrected. However, the resulting data is such that a small amount of cyan ink is applied in addition to magenta ink and yellow ink. By contrast, if values (C, M, Y, K)=(0, 239, 240, 0) are output as illustrated in Table 5, the pure color is preserved by the restriction that only magenta ink and yellow ink are used without the application of cyan ink. Here, M=Y is not needed, and the purpose of pure color preservation is achieved if C=K=0. In generating Table 5, the C, M, Y, and K values are selected to reduce a color difference from the target color with the restriction that C=K=0 so that pure red color is preserved.

Next, colors on the gray line connecting the white and black points will be described. If the input data is R=G=B, the color falls on a point on the gray line. For example, (R, G, B)=(16, 16, 16) represent dark gray. Suppose that the C, M, Y, and K values selected to reduce a color difference from the target color are (C, M, Y, K)=(1, 1, 0, 240) as illustrated in Table 4. The resulting color is produced by mainly using black ink but with the application of small amounts of cyan and magenta inks. If pure color preservation is intended. (C, M, Y, K)=(0, 0, 0, 240) are selected as illustrated in Table 5. Such signal values enables printing of a color having a small color difference from the target color under the restriction that C=M=Y=0. A color having a small color difference from the target color is thereby selected with pure color preservation.

FIG. 8C illustrates conversion tables to be used in an image processing flow in which CMYK data is input to the CS processing and converted into CMYK data as described with reference to FIG. 7D. Table 6 is a table defining input data. In the present image processing flow, input data is defined by CMYK=0% to 100%. Here, "0" represents no ink application, and "100" represents a maximum signal value for ink application. Tables 7 and 8 illustrate output values to be output by the execution of the CS processing on the input values defined in Table 6. A primary color is a color with a non-zero value in any one of C, M, Y, and K, and zeros in the remaining three. A secondary color is a color with non-zero values in any two of C, M, Y, and K, and zeros in the remaining two. For example, suppose that input values of a primary color of cyan (C, M, Y, K)=(75, 0, 0, 0) are given, and the CMYK values are selected to reduce a color difference from the target color. Here, as illustrated in Table 7 intended for the CS1 processing, magenta ink is applied in addition to cyan ink, and the pure color is not preserved. By contrast, if Table 8 intended for the CS2 processing is used, the input values are converted into data that uses only cyan ink, and the pure color is preserved. Although not illustrated in the diagram, if blue (secondary color) input values (C, M, Y, K)=(50, 50, 0, 0) are given, Table 7 used in the CS1 processing provides an output of (C, M, Y, K)=(50, 50, 1, 0) and the secondary pure color is not preserved. Table 8 used in the CS2 processing provides an output of (C, M, Y, K)=(49, 51, 0, 0) and the secondary pure color is preserved.

As described above, if Table 7 intended for the CS1 processing is used, a combination of ink values that can reproduce a color having a small color difference from the target color is output without a restriction on the inks to be used regardless of the input color. By contrast, if Table 8 intended for the CS2 processing is used, pure colors are preserved by imposing the restriction that if the CMYK values of the input color include zero, corresponding inks are not applied.

Figure 9:
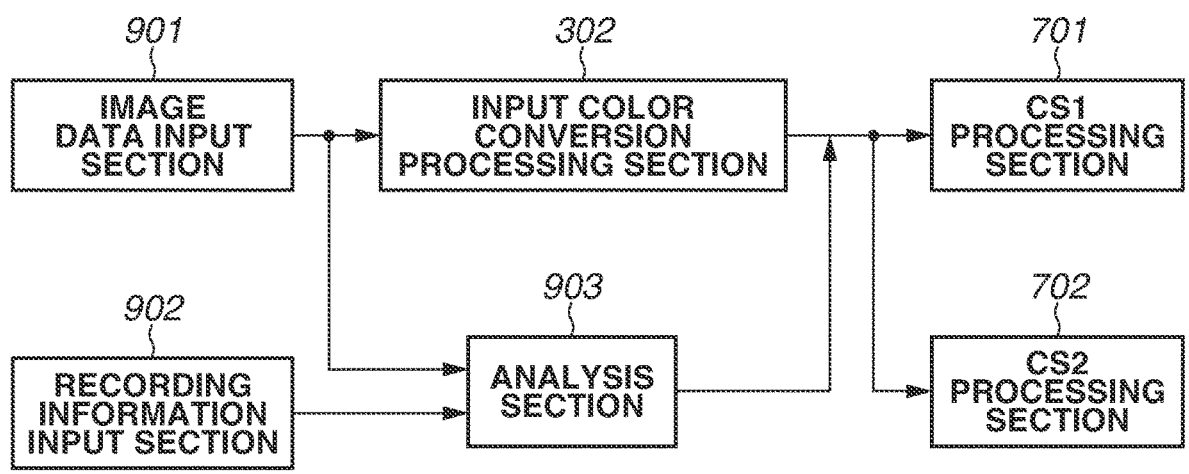
FIG. 9 is a diagram for describing a processing flow for branching.

Next, a processing flow for branching into a plurality of CS processing sections will be described with reference to FIG. 9. This branch processing includes an image data input section 901, a recording information input section 902, and an analysis section 903. The image data input section 901 and the recording information input section 902 have functions corresponding to the input section 712 illustrated in FIGS. 7A, 7B, 7C, 7D, and 7E. Initially, original image data to be recorded is input to the image data input section 901. The image data may be defined in the RGB color space, in the CMYK color space, or by color numbers based on a general standard. The image data may include an image attribute added by an application in addition to pixel-by-pixel signal values.

Recording information, such as information about a print mode and various settings set by the user and information about the recording apparatus, is input to the recording information input section 902. Examples of the information set by the user include the types of inks and sheets to be used, the presence or absence of finishing such as gloss finishing, and a setting intended for a specific request whether to preserve pure colors. Examples of the information about the recording apparatus include information about the types of inks provided by the recording apparatus, such as whether light-color inks are provided, and magnitude of variations in the amount of discharge of the recording heads 101 to 104. The image data input to the image data input section 901 and the recording information input to the recording information input section 902 are input to the analysis section 903. In the analysis section 903, the image data and the recording information are analyzed to generate the switch flags for switching the CS processing based on a preset condition. As described above, switching the CS processing refers to switching whether to perform the CS1 processing for correcting color unevenness with high precision without preserving pure colors by not restricting the ink types to be used for recording or the CS2 processing for correcting color unevenness while preserving pure colors. The image data may be analyzed by referring to pixel values or an image attribute, or based on a data format of the image data, a result of a frequency analysis or object analysis made on the image. The switch flags are attached with appropriate granularities, such as in units of objects within a page, areas, and pixels. Whether to generate the switch flags may be determined based on a combination of a plurality of pieces of information such as color information on pixels and image attributes, and/or in conjunction with user specifications.

In the present embodiment, the switch flags are generated by analyzing an image type attribute attached pixel by pixel. In a process upstream of the image processing flow illustrated in FIG. 9, the user generates a document to be printed by arranging objects such as images and characters using an appropriate application. The images are rendered to an appropriate resolution such as 600 dpi and 1200 dpi by the application. The objects are analyzed and image type attributes are attached pixel by pixel. There are three image type attributes, "picture", "text", and "graphics", which are expressed in two bits. In the image processing flow illustrated in FIG. 9, a set of pixel values expressing image colors and image type attribute is input to the image data input section 901. The analysis section 903 analyzes the image type attribute, and attaches a switch flag indicating that the CS1 processing is applied to a "picture" pixel and a switch flag indicating that the CS2 processing is applied to the remaining "text" and "graphics" pixels. A photographic image includes gradations all over, and high-precision color unevenness correction is desired rather than pure color preservation. Thus, the CS1 processing is applied to picture portions. Uniform images such as characters and graphics can cause granularities and a drop in sharpness due to misregistration of recording position if pure colors are not preserved. Thus, the CS2 processing is applied to such uniform images. Accordingly, color unevenness correction and pure color preservation are achieved on the images of various attributes in a compatible manner, whereby favorable images are recorded. The switch flags for the CS processing may be attached based on a condition on which the user's intention can be easily reflected. For example, a switch flag may be attached to pages that the user designates for pure color preservation by using a user interface (UI), or to colors that the user designates for pure color preservation.

Figure 10:
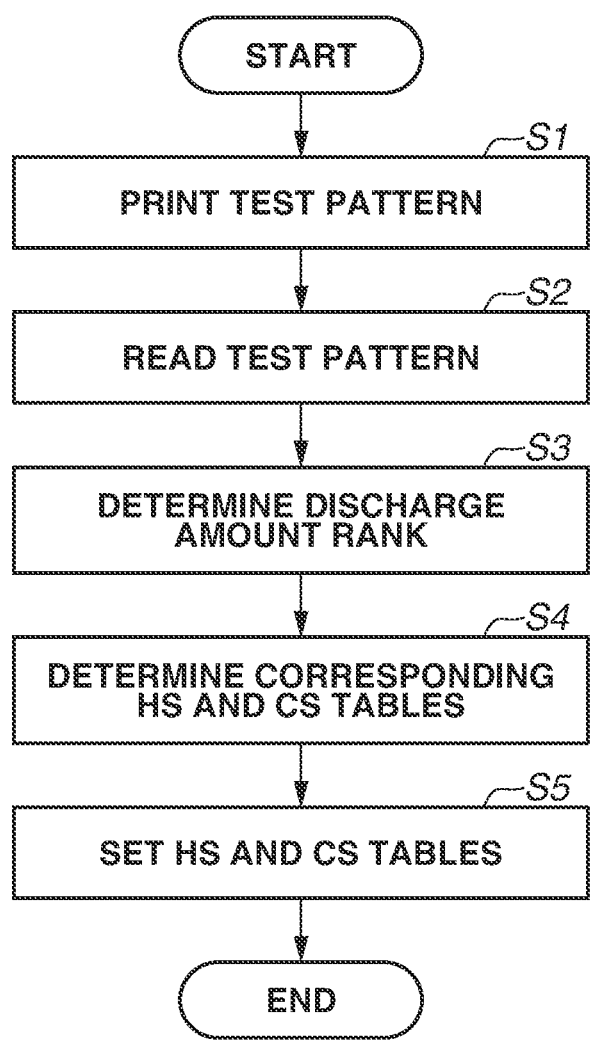
FIG. 10 is a flowchart illustrating a method for determining conversion tables to be applied to the HS processing and the CS processing.

Next, a method for determining the conversion tables to be applied to the HS processing and the CS processing will be described with reference to FIG. 10. In step S1, the recording apparatus prints a predetermined test pattern under a predetermined condition. In step S2, the reading apparatus reads the printed test pattern. Here, the reading apparatus is the scanner 107 described in FIG. 1A, arranged downstream of the recording heads 101 to 104. However, the reading apparatus may be a camera. A scanner, a camera, or a sensor provided outside the recording apparatus may be used. Next, the image processing apparatus analyzes the read values in units of correction units including one or a plurality of nozzles. If the density of the image in the read correction unit is high, the nozzle group recording the corresponding correction unit is determined to have a large amount of discharge. If the density thereof is low, the nozzle group recording the corresponding correction unit is determined to have a small amount of discharge. In step S3, the image processing apparatus determines the discharge amount rank of each correction unit in a predetermined number of ranks (for example, in three ranks including large, medium, and small, or ten ranks from large to small) based on a preset criterion. HS tables (conversion tables for the HS processing) and CS tables (conversion tables for the CS processing) corresponding to the respective ranks are stored in a storage in advance. In step S4, the image processing apparatus determines an HS table and a CS table corresponding to the determined discharge amount rank. Since the discharge amount rank varies from one correction unit to another, different conversion tables are determined for respective correction units. In step S5, the image processing apparatus sets the determined HS and CS tables to the HS and CS processing sections, respectively.

The amounts of discharge may be estimated by a method other than printing a test pattern as described above. The discharge amount ranks may be measured and given to the recording heads when the recording heads are manufactured. In such a case, the processing of step S4 and later may be performed since the discharge amount ranks are determined without printing a test pattern. Conversion tables intended for the CS1 processing for correcting color unevenness with high precision and conversion tables intended for the CS2 processing for correcting color unevenness while preserving pure colors are provided as the CS tables for respective discharge amount ranks.

As described above, according to the present embodiment, processing suitable for each image is performed by applying the CS1 processing for correcting color unevenness with high precision and the CS2 processing for correcting color unevenness while preserving pure colors to the input image data in a switching manner. Thus, the reduction of color unevenness and the suppression of granularities and a drop in sharpness can be achieved in a compatible manner.

In the present embodiment, the input image data is described to be data expressed in RGB. However, this is not restrictive, and each pixel may be expressed in the CMYK format. Color numbers associated with colors expressed in an input-independent color space (such as Lab) according to an existing standard may also be used. The input color conversion processing section 302 may use a method of converting the input image data from a data format in the device-dependent color space such as RGB and CMYK into a device-independent color space such as Lab and XYZ, and further converting the resultant into a device-dependent color space. The number of bits in each intermediate process is described to be eight. However, this is not restrictive. A greater number of gradations such as 16 bits may be employed for higher image quality. If the recording apparatus provides other types of inks in addition to the basic CMYK inks, conversion into corresponding ink colors is performed. The image data is converted into ink color data corresponding to the inks provided by the recording apparatus in the ink color separation processing section 304, and the subsequent processing is performed as much as the number of ink colors. While three- or one-dimensional LUTs are described to be used to convert the image data in each correction process, other formats (such as information about functions) may be used.

In the present embodiment, the CS processing is described to be switched based on image types such as a picture and text. However, the CS processing may be switched based on a format of the image data. Input image data can use more than one data format, such as bitmap and vector formats, object by object. In such a case, the CS processing is switched based on the data formats. The bitmap format is often designated for pictures. The vector format is often designated for characters and graphics. The CS1 processing for correcting color unevenness with high precision is suitable for photographic images. The CS2 processing for correcting color unevenness while preserving pure colors is suitable for text and graphic images.

The CS processing may be switched by analyzing the image itself. A pixel gradation analysis, edge detection, frequency analysis, and object detection such as face recognition are performed on the input image in advance to detect local image features. As a result of the analysis, areas having a relatively high frequency characteristic or a large change in gradation are determined to have not much need for pure color preservation since granularities and misregistration of dot print positions are less noticeable. The switch flag for performing the CS1 processing is attached to such image areas for color unevenness correction with high precision. On the other hand, areas having a relative low frequency characteristic or a small change in gradation are likely to be uniform images called "solid images". Since the application of inks of other colors can produce noticeable granularities, the switch flag for performing the CS2 processing is attached to such image areas for pure color preservation. If an edge is detected, the switch flag for performing the CS2 processing for preserving pure colors can be attached to suppress a drop in edge sharpness due to misregistration of printing positions. Areas where an object such as a face is detected can be subjected to the CS1 processing in the same way as "pictures" so that color unevenness is corrected with high precision. Determinations with even higher precision are made based on a combination of various analyses or a combination with other information such as UI settings.

The switch flags for switching the CS processing may be attached based on the magnitude of differences in the amount of discharge of the recording apparatus. After the discharge amount ranks of the mounted recording heads are determined, whether to perform the CS1 processing or the CS2 processing is determined based on the distribution thereof. Nozzle areas where variations in the amount of discharge are small in a recording head produce less color unevenness in the recorded image. Thus, noticeable color unevenness will not occur even if the CS2 processing is performed to preserve pure colors with a somewhat lower effect of color unevenness correction. By contrast, nozzle areas where variations in the amount of discharge are large in a recording head produce much color unevenness in the recorded image. The CS2 processing can fail to provide a sufficient effect of color unevenness correction, and visible color unevenness can be left. In such a case, color unevenness can be corrected with high precision by applying the CS1 processing to permit the use of inks of other colors even for pure colors.

Figure 11A:
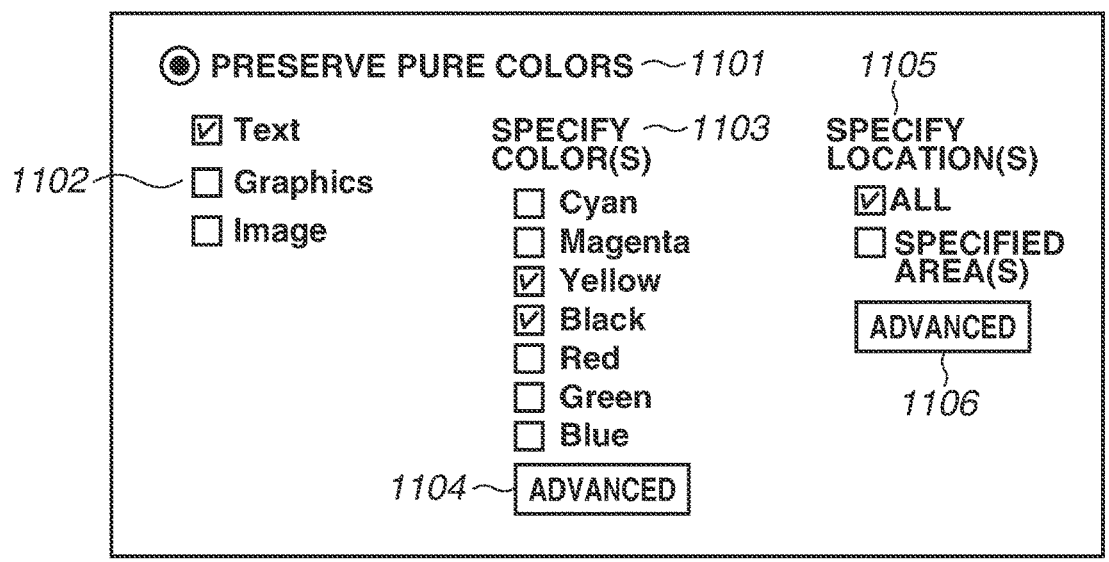
FIGS. 11A, 11B, 11C, and 11D illustrate examples of user interfaces.

FIG. 11A illustrates an example of a UI applicable to a second embodiment. The user can obtain a print product better matching the need by operating the UI. The UI includes a radio button 1101 for determining whether to preserve pure colors. If the radio button 1101 is not active, other detailed settings are grayed out. If the radio button 1101 is active, the user can make more detailed settings.

A UI 1102 is intended to turn on/off pure color preservation settings based on image attributes given by an application pixel by pixel or object by object. The UI 1102 includes checkboxes for selecting what type of image to preserve pure colors of. More specifically, the UI 1102 includes checkboxes "Text", "Graphics", and "Image", and the user marks the checkbox of an image attribute to be recorded with pure colors preserved. One or a plurality of checkboxes may be marked. For example, if "Text" is marked, the CS2 processing intended for pure color preservation is performed on pixels having the image attribute of "Text".

Figure 11B:
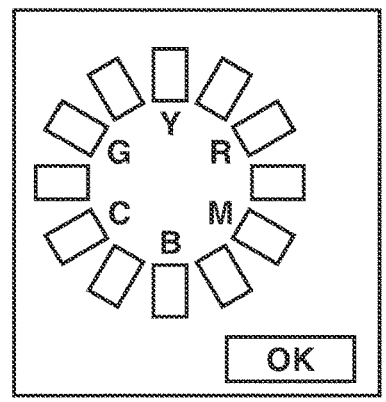
Figure 11C:
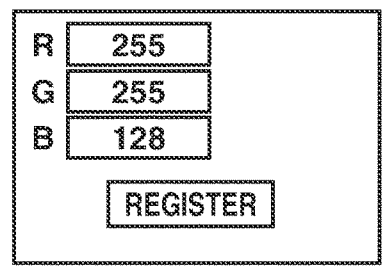

A UI 1103 includes checkboxes for setting pure colors to be preserved. The user makes settings so that desired pure colors are preserved. The user can enter another screen to make more detailed settings by pressing an "ADVANCED" button 1104. FIG. 11B illustrates an example of the detailed setting screen. The user can specify the color of a desired hue as a pure color to be preserved. FIG. 11C illustrates an example of a screen for specifying a color in more detail. The user can specify the signal values of the pure color to be preserved (if the image data is in RGB, the R, G, and B signal values). To specify a plurality of colors, the user can register a color in a library of pure colors to be preserved by pressing a "REGISTER" button. Colors may be specified in the CMYK format or in color numbers.

Figure 11D:
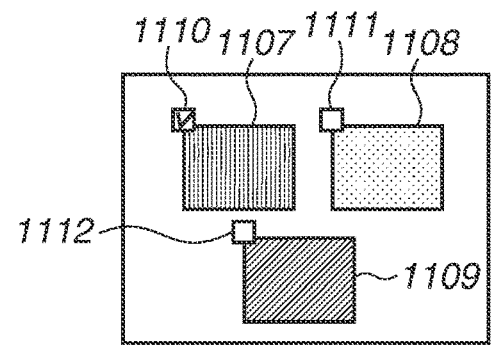

A UI 1105 includes checkboxes for setting areas to perform pure color preservation. The user may specify the entire area or specific areas. The user can enter another screen to make detailed settings by pressing an "ADVANCED" button 1106. FIG. 11D illustrates an example of the detailed setting screen. The image processing apparatus analyzes document image data in advance and displays a preview. The user sets an area or areas to preserve pure colors on the preview screen by using a method such as selecting a desired object by a checkbox or freely selecting a location with a mouse. FIG. 11D illustrates a state where three objects 1107, 1108, and 1109 are previewed. Checkboxes 1110, 1111, and 1112 are displayed on the objects 1107, 1108, and 1109, respectively. If the user desires to preserve pure colors of only the object 1107, the user marks only the checkbox 1110 corresponding to the object 1107.

Based on the foregoing UI settings, the CS processing of the CS2 processing section 702 illustrated in FIG. 7A is performed on the contents, colors, and/or locations for which "pure color preservation" is specified. The CS processing of the CS1 processing section 701 illustrated in FIG. 7A is performed on the contents, colors, and locations for which "pure color preservation" is not specified. In such a case, Table 2 described with reference to FIG. 8A is applied to the CS1 processing section 701. Table 3 described with reference to FIG. 8A is applied to the CS2 processing section 702.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2018-203274, filed Oct. 29, 2018, which is hereby incorporated by reference herein in its entirety.

What is claimed is:

1. An image processing apparatus configured to process image data for a recording apparatus, the recording apparatus being configured to record an image on a recording medium by applying ink from a recording device while relatively conveying the recording device and the recording medium in a second direction intersecting a first direction, the recording device including a first nozzle row in which a plurality of nozzles configured to discharge a first ink is arranged in the first direction and a second nozzle row in which a plurality of nozzles configured to discharge a second ink of different color from that of the first ink is arranged in the first direction, the first and second nozzle rows being arranged in the second direction, the image processing apparatus comprising:
   a color conversion unit configured to color-convert image data including a plurality of components corresponding to a plurality of colors into image data including a plurality of components in a color space reproducible by the recording apparatus;
   a color correction unit configured to color-correct the image data including the plurality of components color-converted by the color conversion unit into image data including a plurality of components by using color correction information for correcting a color shift due to a variation in a discharge characteristic of the nozzles; and
   a generation unit configured to generate ink color data indicating amounts of application of the respective first and second inks based on the image data including the plurality of components color-corrected by the color correction unit,
   wherein in a case where image data indicating a predetermined color having a hue corresponding to the first ink is color-corrected by using first information as the color correction information, ink color data generated based on the color-corrected image data indicating the predetermined color indicates that the first ink is applied and the second ink is not applied, and
   wherein in a case where the image data indicating the predetermined color is color-corrected by using second information as the color correction information, the ink color data generated based on the color-corrected image data indicating the predetermined color indicates that the second ink is applied.

2. The image processing apparatus according to claim 1, wherein in a case where the image data indicating the predetermined color is color-corrected by using the second information, the ink color data generated based on the color-corrected image data indicating the predetermined color indicates that the first ink is applied.

3. The image processing apparatus according to claim 1, wherein the color correction unit is configured to color-correct the image data in a color space including a plurality of elements, and
   wherein in a case where image data indicating a point on a first line connecting a point representing a maximum value of the color corresponding to the first ink and a white point in the color space including the plurality of elements is input, the first information is information imposing a restriction that a point indicated by the color-corrected image data lies on the first line.

4. The image processing apparatus according to claim 3, wherein the generation unit is configured to, in a case where the point indicated by the image data color-corrected by the color correction unit lies on the first line in the color space including the plurality of elements, generate ink color data indicating that the first ink is applied and the second ink is not applied based on the color-corrected image data.

5. The image processing apparatus according to claim 3, wherein in a case where the image data indicating the point on the first line in the color space including the plurality of elements is input, the second information is information not imposing the restriction that the point indicated by the color-corrected image data lies on the first line.

6. The image processing apparatus according to claim 3, wherein the color space including the plurality of elements is a red, green, blue (RGB) color space.

7. The image processing apparatus according to claim 1, wherein the first ink is achromatic ink and the second is chromatic ink.

8. The image processing apparatus according to claim 1, wherein the recording device further includes a third nozzle row in which a plurality of nozzles configured to discharge a third ink of different color from that of both the first and second inks is arranged in the first direction, the third nozzle row being arranged in the second direction,
   wherein the ink color data generated by the generation unit further includes data indicating an amount of application of the third ink, and
   wherein in a case where the image data indicating the predetermined color is color-corrected by using the first information, the ink color data generated based on the color-corrected image data indicating the predetermined color indicates that the third ink is not applied.

9. The image processing apparatus according to claim 8, wherein the first ink is yellow ink, and one of the second and third inks is cyan ink and the other is magenta ink.

10. The image processing apparatus according to claim 8, wherein the first second, and third inks are any one of yellow ink, cyan ink, and magenta ink each.

11. The image processing apparatus according to claim 8, wherein in a case where image data indicating a predetermined secondary color to be formed by using inks of any two colors of the first, second, and third inks is color-corrected by the color correction unit by using the first information, the ink color data generated based on the color-corrected image data indicating the predetermined secondary color indicates that the inks of the two colors are applied and the ink not included in the inks of the two colors of the first, second, and third inks is not applied, and
   wherein in a case where the image data indicating the predetermined secondary color is color-corrected by the color correction unit by using the second information, the ink color data generated based on the color-corrected image data indicating the predetermined secondary color indicates that the first, second, and third inks are applied.

12. The image processing apparatus according to claim 11,
wherein the color correction unit is configured to color-correct the image data in a color space including a plurality of elements, and
wherein in a case where image data indicating a point on a first plane including two points representing maximum values of the colors corresponding to the inks of the respective two colors and a white point in the color space including the plurality of elements is input, the first information is information imposing a restriction that a point indicated by the color-corrected image data lies within the first plane, and the second information is information not imposing the restriction that the point indicated by the color-corrected image data lies within the first plane.

13. The image processing apparatus according to claim 12, wherein the generation unit is configured to, in a case where the point indicated by the image data color-corrected by the color correction unit lies within the first plane in the color space including the plurality of elements, generate ink color data indicating that the inks of the two colors are applied and the ink not included in the inks of the two colors of the first, second, and third inks is not applied based on the color-corrected image data.

14. The image processing apparatus according to claim 11, wherein the predetermined secondary color is any one of red, blue and green.

15. The image processing apparatus according to claim 1, wherein the recording device applies a plurality of types of inks of similar colors having different densities as the first ink.

16. The image processing apparatus according to claim 1, wherein the first ink is any one of orange, green, violet, and blue inks.

17. The image processing apparatus according to claim 1, wherein the color correction unit further includes a setting unit configured to set whether to use the first information or the second information as the color correction information.

18. The image processing apparatus according to claim 17, wherein the setting unit is configured to set either the first information or the second information based on information set by a user.

19. The image processing apparatus according to claim 17, wherein the setting unit is configured to set either the first information or the second information based on an attribute of the image data including the plurality of components.

20. The image processing apparatus according to claim 19, wherein the setting unit is configured to make a setting so that the first information is used for an object having a text or graphic attribute and the second information is used for an object having a picture attribute.

21. The image processing apparatus according to claim 17, wherein the setting unit is configured to make a setting so that the first information is used for an image of vector format and the second information is used for an image of bitmap format.

22. The image processing apparatus according to claim 17, wherein the setting unit is configured to make a setting so that the first information is used for an image having a relatively low frequency characteristic and the second information is used for an image having a relatively high frequency characteristic.

23. The image processing apparatus according to claim 17, wherein the setting unit is configured to make a setting to use the first information or the second information in units of contents within a page, areas, or pixels.

24. The image processing apparatus according to claim 1, wherein the recording device includes a first recording head having the first nozzle row and a second recording head having the second nozzle row.

25. An image processing method for processing image data for a recording apparatus, the recording apparatus being configured to record an image on a recording medium by applying ink from a recording device while relatively conveying the recording device and the recording medium in a second direction intersecting a first direction, the recording device including a first nozzle row in which a plurality of nozzles configured to discharge a first ink is arranged in the first direction and a second nozzle row in which a plurality of nozzles configured to discharge a second ink of different color from that of the first ink is arranged in the first direction, the first and second nozzle rows being arranged in the second direction, the image processing method comprising:

color-converting image data including a plurality of components corresponding to a plurality of colors into image data including a plurality of components in a color space reproducible by the recording apparatus;

color-correcting the color-converted image data including the plurality of components into image data including a plurality of components by using color correction information for correcting a color shift due to a variation in a discharge characteristic of the nozzles; and generating ink color data indicating amounts of application of the respective first and second inks based on the color-corrected image data including the plurality of components, wherein in a case where image data indicating a predetermined color having a hue correspond to the first ink is color-corrected by using first information as the color correction information, ink color data generated based on the color-corrected image data indicating the predetermined color indicates that the first ink is applied and the second ink is not applied, and wherein in a case where the image data indicating the predetermined color is color-corrected by using second information as the color correction information, the ink color data generated based on the color-corrected image data indicating the predetermined color indicates that the second ink is applied.

26. A non-transitory computer-readable storage medium that stores a computer program comprising computer readable instructions which, when the program is executed by a computer, cause the computer to carry out the method of claim 25.

* * * * *